United States Patent [19]

Shibata et al.

[11] Patent Number: 5,003,781
[45] Date of Patent: Apr. 2, 1991

[54] AIR SUPPLY AND EXHAUST CONTROL SYSTEMS FOR TURBOCHARGED INTERNAL COMBUSTION ENGINES

[75] Inventors: Masanori Shibata, Hiroshima; Haruo Okimoto, Aki; Toshimichi Akagi, Hiroshima; Seiji Tashima, Aki, all of Japan

[73] Assignee: Mazda Motor Corporation, Hiroshima, Japan

[21] Appl. No.: 353,752

[22] Filed: May 18, 1989

[30] Foreign Application Priority Data

May 23, 1988 [JP] Japan ................... 63-125418

[51] Int. Cl.$^5$ ............................ F02B 37/12
[52] U.S. Cl. ...................... 60/600; 60/612; 181/226
[58] Field of Search ............ 60/602, 612, 600; 181/226

[56] References Cited

U.S. PATENT DOCUMENTS

| 2,380,777 | 7/1945 | Moss | 60/612 X |
| 4,709,552 | 12/1987 | Rutschman et al. | 60/600 |

FOREIGN PATENT DOCUMENTS

| 41417 | 4/1981 | Japan . | |
| 12177 | 3/1982 | Japan . | |
| 110822 | 7/1983 | Japan | 60/600 |
| 74325 | 4/1984 | Japan . | |
| 160022 | 9/1984 | Japan . | |
| 178329 | 11/1985 | Japan . | |
| 259722 | 12/1985 | Japan . | |
| 38124 | 2/1986 | Japan . | |
| 275531 | 12/1986 | Japan . | |
| 107225 | 5/1987 | Japan | 60/602 |

Primary Examiner—Michael Koczo
Attorney, Agent, or Firm—Sixbey, Friedman, Leedom & Ferguson

[57] ABSTRACT

An air supply and exhaust control system for an internal combustion engine comprises at least first and second turbosuperchargers, an operation prohibiting portion for prohibiting the second turbosupercharger from working as occasion demands, an exhaust gas flow detecting portion, an air supply control portion for causing the operation prohibiting portion to prohibit the second turbosupercharger from working when a detection output from the exhaust gas flow detecting portion indicates that the exhaust gas flow is less than a first predetermined value, an exhaust gas discharging device connected to an exhaust passage in possession of variable exhaust resistance for discharging the exhaust gas, an exhaust resistance changing portion for changing the variable exhaust resistance, and an exhaust control portion for controlling the exhaust resistance changing portion to set the variable exhaust resistance to be relatively small when the detection output from the exhaust gas flow detecting portion indicates that the exhaust gas flow is more than a second predetermined value which is smaller than the first predetermined value and to be relatively large when the detection output from the exhaust gas flow detecting portion indicates that the exhaust gas flow is equal to or less than the second predetermined value.

17 Claims, 10 Drawing Sheets

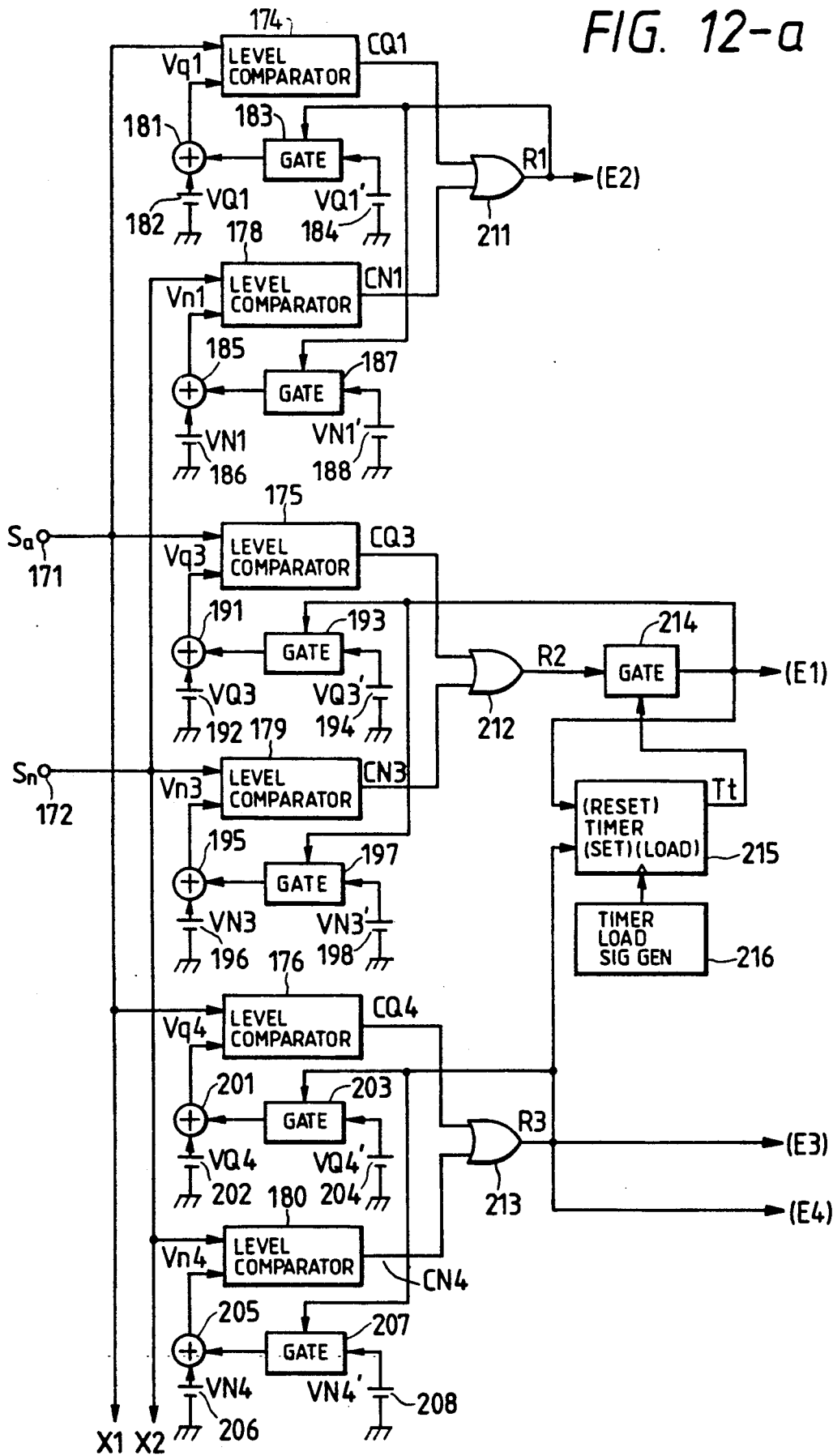
FIG. 12-a

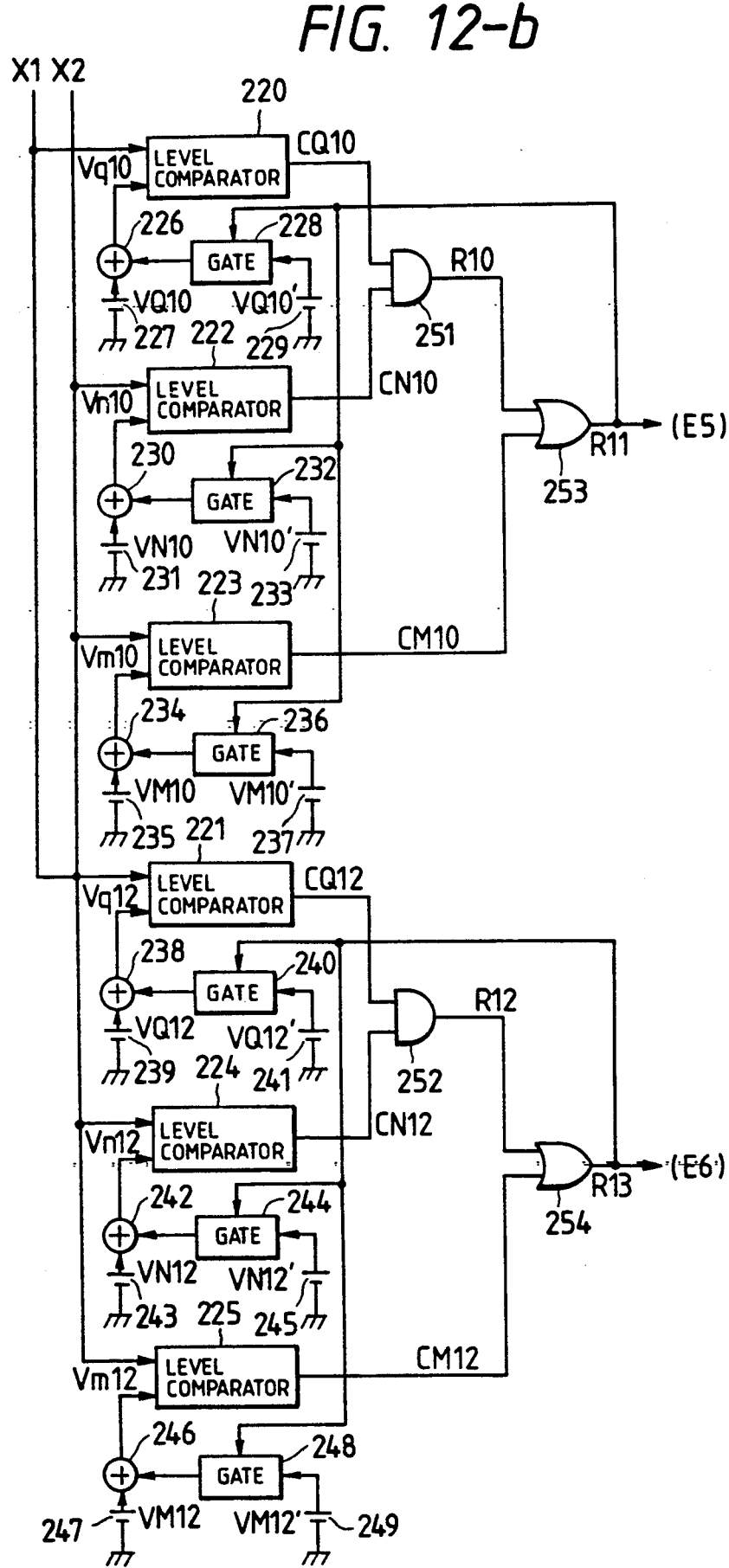
FIG. 12-b

AIR SUPPLY AND EXHAUST CONTROL SYSTEMS FOR TURBOCHARGED INTERNAL COMBUSTION ENGINES

BACKGROUND OF THE INVENTION

1. Field of the Invention

The present invention relates generally to air supply and exhaust control systems for internal combustion engines, and more particularly to a system for controlling air supply effected to an internal combustion engine by a plurality of turbosuperchargers accompanying with the internal combustion engine in substantially parallel with each other and exhaust discharged through an exhaust passage having variable exhaust resistance from the internal combustion engine.

2. Description of the Prior Art

In the field of internal combustion engines used in vehicles, there has been proposed a so-called sequentially controlled supercharging system in which a couple of turbosuperchargers of primary and secondary are employed in an internal combustion engine and so controlled that the engine is put in a first operating condition wherein only the primary turbosupercharger works for supercharging the engine or in a second operating condition where both the primary and secondary turbosuperchargers work simultaneously for supercharging the engine selected in accordance with exhaust gas flow from the engine, as disclosed in, for example, each of Japanese patent applications published before examination under publication numbers 56-41417, 59-160022, 60-259722, 61-275531 and 61-38124, Japanese utility model application published before examination under publication number 60-178329, and Japanese utility model application published after examination under publication number 57-12177. In such a system, the primary and secondary turbosuperchargers are provided with respective turbines disposed in portions of an exhaust passage of the engine which extend in substantially parallel with each other and respective blowers disposed in branch intake passages of the engine, and an exhaust cutoff valve is disposed in the portion of the exhaust passage through which exhaust gas is applied to the turbine of the secondary turbosupercharger to be closed so as to supply the turbine of the primary turbosupercharger with the exhaust gas collectively when the exhaust gas flow in the exhaust passage is relatively small and to be opened so as to supply both the turbines of the primary and secondary turbo-superchargers with the exhaust gas when the exhaust gas flow in the exhaust passage is relatively large. With such an operation of the exhaust cutoff valve, intake air compressed by the blower of the primary turbosupercharger or the blowers of the primary and secondary turbosuperchargers is supplied to a combustion chamber of the engine with required intake air mass flow responding to various operating conditions of the engine.

In the previously proposed sequentially controlled supercharging system constituted as mentioned above, the exhaust cutoff valve is controlled frequently to be open and closed selectively in response to variations in the exhaust gas flow so that the secondary turbosupercharger is caused to operate and to cease operating selectively in accordance with the opening and closing operation of the exhaust cutoff valve and therefore there is a fear of a control system for the exhaust cutoff valve being lowered in reliability. Accordingly, for avoiding such a fear, it may be considered to set a threshold value of the exhaust gas flow by which the exhaust cutoff valve is tuned into opening from closing to be relatively large so that an operating area provided on an operating characteristic chart of the engine, which may be shown with an axis of abscissa representing engine speed and an axis of ordinate representing engine load, wherein only the primary turbosupercharger is to work is extended and thereby to cause the exhaust cutoff valve to be reduced in frequency of opening and closing so that the control system for the exhaust cutoff valve is improved in reliability.

However, in the case where the threshold value of the exhaust gas flow by which the exhaust cutoff valve is tuned into opening from closing is set to be relatively large, exhaust pressure in the exhaust passage at a location downstream of the turbine of the primary turbosupercharger is increased excessively and thereby the primary turbosupercharger is undesirably compelled to work with reduced efficiency when the exhaust gas flow is relatively large.

OBJECTS AND SUMMARY OF THE INVENTION

Accordingly, it is an object of the present invention to provide an air supply and exhaust control system for an internal combustion engine provided with a plurality of turbosuperchargers including at least first and second turbosuperchargers which are so controlled that the engine is put in a first operating condition wherein only the first turbosupercharger works for supercharging the engine or in a second operating condition where both the first and second turbosuperchargers work simultaneously for supercharging the engine selected in accordance with exhaust gas flow from the engine, which avoids the foregoing disadvantages and problems encountered with the prior art.

Another object of the present invention is to provide an air supply and exhaust control system for an internal combustion engine provided with a plurality of turbosuperchargers including at least first and second turbosuperchargers which are so controlled that the engine is put in a first operating condition wherein only the first turbosupercharger works for supercharging the engine or in a second operating condition where both the first and second turbosuperchargers work simultaneously for supercharging the engine selected in accordance with exhaust gas flow from the engine, in which a threshold value of the exhaust gas flow by which the second turbosupercharger is tuned to be operative from inoperative can be set to be relatively large without causing exhaust pressure in an exhaust passage at a location downstream of the first turbosupercharger to be increased excessively when the exhaust gas flow is relatively large.

A further object of the present invention is to provide an air supply and exhaust control system for an internal combustion engine provided with a plurality of turbosuperchargers including at least first and second turbosuperchargers which are so controlled that the engine is put in a first operating condition wherein only the first turbosupercharger works for supercharging the engine or in a further object of the second operating condition where both the first and second turbosuperchargers work simultaneously for supercharging the engine selected in accordance with exhaust gas flow from the engine, in which a threshold value of the exhaust gas flow by which the second turbosupercharger is tuned to be operative from inoperative can be set to be relatively large without bringing about a condition in which the first turbosupercharger is compelled undesirably to work with reduced efficiency on the occasion of relatively large exhaust gas flow.

According to the present invention, there is provided an air supply and exhaust control system for an internal combustion engine comprising a plurality of superchargers including at least first and second turbo-superchargers having respective turbines disposed in portions of an exhaust passage connected with the engine in parallel with each other and respective blowers disposed in branch portions of an intake passage connected with the engine, an operation prohibiting portion including an exhaust cutoff valve provided in the portion of the exhaust passage wherein the turbine of the second turbosupercharger is disposed for closing the portion of the exhaust passage so as to prohibit the second turbosupercharger from working as occasion demands, an exhaust gas flow detecting portion for obtaining a detection output signal corresponding to exhaust gas flow in the exhaust passage, an air supply control portion for controlling the operation prohibiting portion to prohibit the second turbosupercharger from working when the detection output signal from the exhaust gas flow detecting portion indicates that the exhaust gas flow is less than a first predetermined value, an exhaust gas discharging portion connected to a portion of the exhaust passage downstream of the turbine of the first turbosupercharger in possession of variable exhaust resistance for discharging the exhaust gas from the exhaust passage, an exhaust resistance changing portion for changing the variable exhaust resistance of the exhaust gas discharging portion, and an exhaust control portion for controlling the exhaust resistance changing portion to set the variable exhaust resistance to be relatively small when the detection output signal from the exhaust gas flow detecting portion indicates that the exhaust gas flow is more than a second predetermined value which is smaller than the first predetermined value and to be relatively large when the detection output signal from the exhaust gas flow detecting portion indicates that the exhaust gas flow is equal to or less than the second predetermined value.

In the air supply and exhaust control system thus constituted in accordance with the present invention, the second turbosupercharger is prohibited from working by the operation suspending portion and only the first turbo-supercharger is caused to work with the turbine thereof to which exhaust gas from the engine is collectively supplied when the exhaust gas flow in the exhaust passage is less than the first predetermined value, and both the first and second turbosuperchargers are caused to work with respective turbines thereof to each of which the exhaust gas from the engine is supplied when the exhaust gas flow in the exhaust passage is equal to or more than the first predetermined value, so that intake air compressed by the blower of the first turbosupercharger or the blowers of the first and second turbosuperchargers is supplied through the intake passage to a combustion chamber of the engine with required intake air mass flow responding to various operating conditions of the engine.

In addition, the exhaust gas discharging device is controlled by the exhaust resistance changing portion to provide a relatively large exhaust resistance for discharging the exhaust gas from the engine when the exhaust gas flow in the exhaust passage is less than the second predetermined value and to provide a relatively small exhaust resistance for discharging the exhaust gas from the engine when the exhaust gas flow in the exhaust passage is equal to or more than the second predetermined value. Accordingly, under a condition in which the only the first turbosupercharger is caused to work, exhaust sound is reduced effectively when the exhaust gas flow in the exhaust passage is less than the second predetermined value and exhaust pressure in the exhaust passage at the location downstream of the turbine of the first turbosupercharger is prevented from increasing excessively when the exhaust gas flow in the exhaust passage is equal to or more than the second predetermined value. This results in an advantage that the first turbosupercharger can work with improved efficiency even if the first predetermined value is set to be relatively large. Consequently, in the system according to the present invention, it is possible to set the first predetermined value to be relatively large so as to cause the exhaust cutoff valve included in the operation prohibiting portion to be reduced in frequency of opening and closing so that a control arrangement for the exhaust cutoff valve is improved in reliability, without bringing about a condition in which the first turbosupercharger is compelled undesirably to work with reduced efficiency.

Incidentally, an example of an exhaust gas discharging device having variable exhaust resistance has been disclosed in Japanese patent application published before examination under publication number 59-74325.

The above, and other objects, features and advantages of the present invention will become apparent from the following detailed description which is to be read in conjunction with the accompanying drawings.

BRIEF DESCRIPTION OF THE DRAWINGS

FIGS. 12-a and 12-b are a block diagram showing an embodied example of a part of a control unit used in the third embodiment shown in FIG. 8.

DESCRIPTION OF THE PREFERRED EMBODIMENTS

Figure 1:
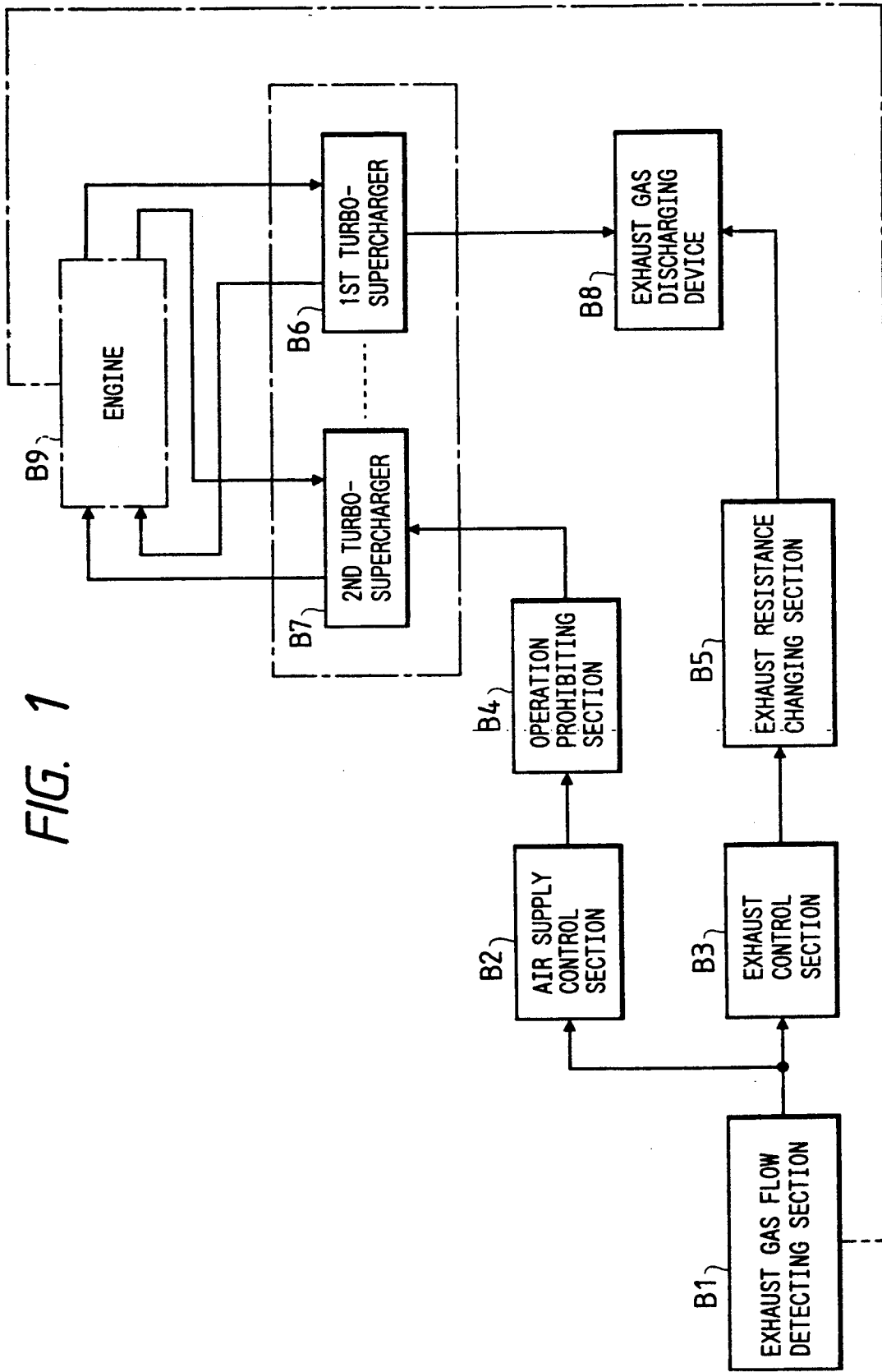
FIG. 1 is a block diagram illustrating the basic arrangement of an air supply and exhaust control system for an internal combustion engine according to the present invention.

FIG. 1 illustrates a functional block diagram of a system incorporating the present invention. In the functional block diagram of FIG. 1, the system comprises an exhaust gas flow detecting section B1, an air supply control section B2, an exhaust control section B3, an operation prohibiting section B4, an exhaust resistance changing section B5, turbosuperchargers including a first turbo-supercharger B6 and a second turbosupercharger B7 and an exhaust gas discharging device B8, and the first and second turbosuperchargers and the exhaust gas discharging device B8 are connected with an engine B9 to which the system is applied.

The first and second turbosuperchargers B6 and B7 have respective turbines disposed in portions of an exhaust passage connected with the engine B9 in parallel with each other and respective blowers disposed in branch portions of an intake passage connected with the engine B9. The operation prohibiting section B4 includes an exhaust cutoff valve provided in the portion of the exhaust passage, in which the turbine of the second turbosupercharger B7 is disposed, for closing to prohibit the second turbo-supercharger B7 from working as occasion demands, and the exhaust gas discharging device B8 is connected to the exhaust passage at a location downstream to the turbine of the first turbosupercharger B6 in possession of variable exhaust resistance. The exhaust gas flow detecting portion B1 is operative to obtain a detection output signal corresponding to exhaust gas flow in the exhaust passage. The air supply control section B2 is operative to control the operation prohibiting section B4 to prohibit the second turbosupercharger B7 from working when the detection output signal from the exhaust gas flow detecting section B1 indicates that the exhaust gas flow is less than a first predetermined value. The exhaust resistance changing section B5 is operative to change the variable exhaust resistance of the exhaust gas discharging device B8 and the exhaust control section B3 is operative to control the exhaust resistance changing section B5 to set the variable exhaust resistance to be relatively small when the detection output signal from the exhaust gas flow detecting section B1 indicates that the exhaust gas flow is more than a second predetermined value which is smaller than the first predetermined value and to be relatively large when the detection output signal from the exhaust gas flow detecting section B1 indicates that the exhaust gas flow is equal to or less than the second predetermined value.

Figure 2:
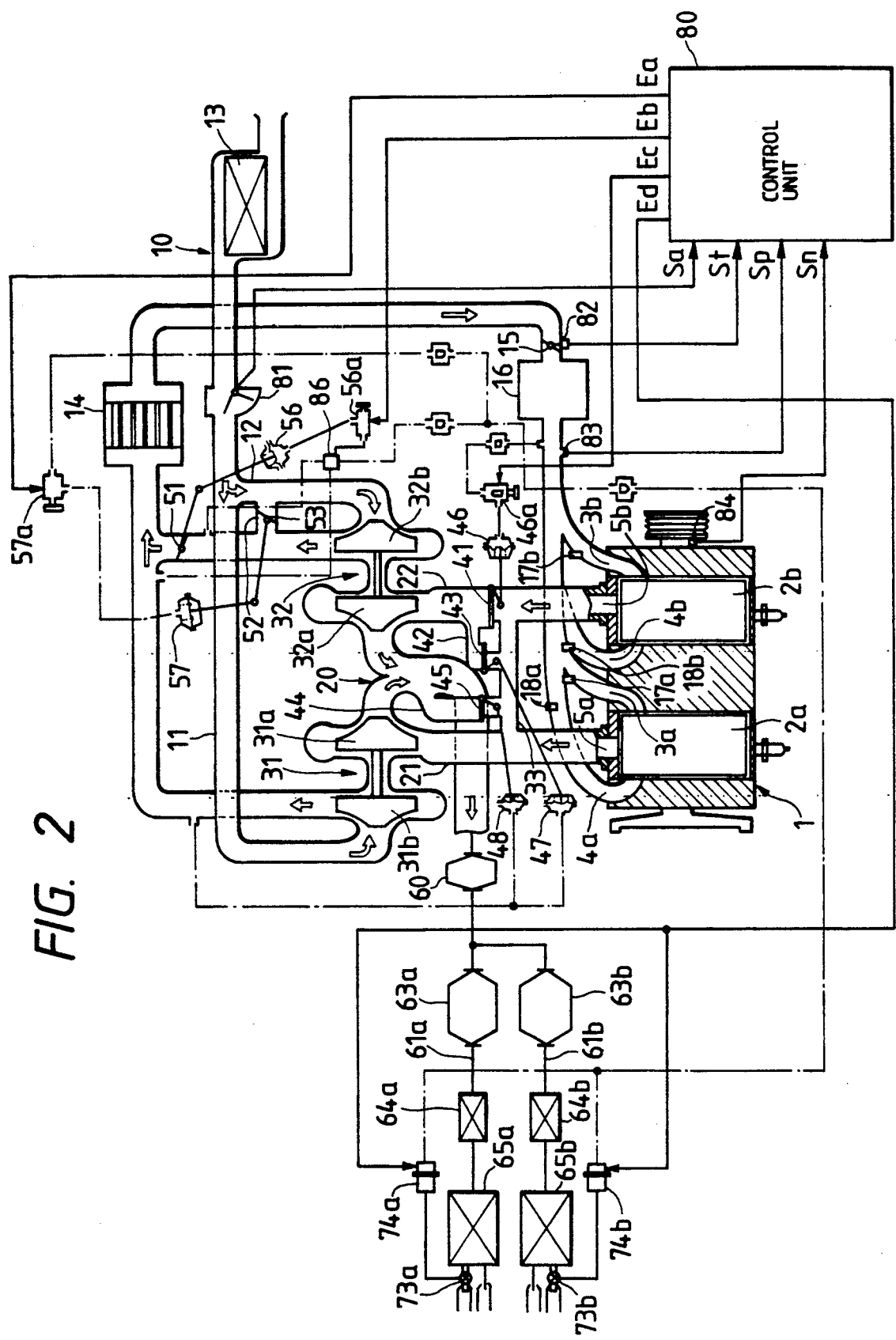
FIG. 2 is a schematic illustration showing a first embodiment of air supply and exhaust control system for an internal combustion engine according to the present invention, together with essential parts of an engine to which the first embodiment is applied.

FIG. 2 illustrates a first embodiment of air supply and exhaust control system according to the present invention, together with a part of an engine to which the first embodiment is applied.

Referring to FIG. 2, an internal combustion engine 1, which is a rotary engine having a couple of rotors 2a an 2b each forming operating chambers for carrying out air suction, compression, explosion and exhaust strokes in a housing, is provided with primary and secondary intake ports 3a and 4a for supplying the operating chamber formed by the rotor 2a for the air intake stroke with intake air and an exhaust port 5a for discharging exhaust gas from the operating chamber formed by the rotor 2a for the exhaust 5, stroke, and provided also with primary and secondary intake ports 3b and 4b for supplying the operating chamber formed by the rotor 2b for the air intake stroke with intake air and an exhaust port 5b for discharging exhaust gas from the operating chamber formed by the rotor 2b for the exhaust stroke. The primary and secondary intake ports 3a, 3b, 4a and 4b are connected respectively to branch end portions of an intake passage 10 which is provided with an air cleaner 13, an air flow sensor 81, an intercooler 14, a throttle valve 15 and a surge chamber 16. The branch end portions of the intake passage 10 are provided fuel injectors 17a, 17b, 18a and 18b, respectively. A portion of the intake passage 10 between the air flow sensor 81 and the intercooler 14 is composed of first and second branch intake passages 11 and 12. Further, the exhaust ports 5a and 5b are connected to first and second separated exhaust passages 21 and 22 which form an upstream portion of an exhaust passage 20.

A primary turbosupercharger 31 is provided with a turbine 31a disposed in the first separated exhaust passage 21 to be driven to rotate by the exhaust gas and a blower 31b disposed in the first branch intake passage 11 and coupled through a rotating shaft with the turbine 31a. A secondary turbosupercharger 32 is also provided with a turbine 32a disposed in the second separated exhaust passage 22 to be driven to rotate by the exhaust gas and a blower 32b disposed in the second branch intake passage 12 and coupled through a rotating shaft with the turbine 32a.

An exhaust cutoff valve 41 is disposed in a portion of the second separated exhaust passage 22 upstream of the turbine 32a. This exhaust cutoff valve 41 is operative to close the second separated exhaust passage 22 in order to prevent the exhaust gas from being supplied to the turbine 32a so that only the primary turbosupercharger 31 works under a condition where exhaust gas flow in the exhaust passage 20 is relatively small.

A portion of the second separated exhaust passage 22 upstream of the exhaust cutoff valve 41 is connected through a connecting passage 33 with a portion of the first separated exhaust passage 21 upstream of the turbine 31a. The connecting passage 33 is also connected with a portion of the second separated exhaust passage 22 between the exhaust cutoff valve 41 and the turbine 32a through an exhaust bypass passage 42 in which an exhaust bypass valve 43 is provided. The connecting passage 33 is further connected with a portion of the exhaust passage 20 downstream of the turbines 31a and 32a through a bypass passage 44 in which a waste gate valve 45 is provided.

The exhaust bypass valve 43 and the waste gate valve 45 are driven by diaphragm actuators 47 and 48, respectively, and pressure chambers of the diaphragm actuators 47 and 48 are coupled through a control pressure pipe with a portion of the first branch intake passage 11 downstream of the blower 31b.

An intake air cutoff valve 51 is disposed in a portion of the second branch intake passage 12 downstream of the blower 32b. The second branch intake passage 12 is provided also with an intake air relief passage 52 detouring the blower 32b and having therein an intake air relief valve 53. The intake air cutoff valve 51 is driven by a diaphragm actuator 56, and the intake air relief valve 53 is driven by a diaphragm actuator 57.

A control pressure pipe extending from the diaphragm actuator 56 for driving the intake air cutoff valve 51 is connected with an output port of a three-way solenoid valve 56a, and a control pressure pipe extending from a diaphragm actuator 46 for driving the exhaust cutoff valve 41 is connected with an output port of a three-way solenoid valve 46a. Further, a control pressure pipe extending from the diaphragm actuator 57 for driving the intake air relief valve 53 is connected with an output port of a three-way solenoid valve 57a. A pressure difference detecting valve 86 for detecting a pressure difference between air pressure at a portion downstream of the blower 31b in the first branch intake passage 11 and air pressure at a portion downstream of the blower 32b in the second branch intake passage 12 is coupled with an input port of the three-way solenoid valve 56a. The three-way solenoid valves 46a, 56a and 57a are controlled by a control unit 80 constituted by a microcomputer.

A downstream portion of the exhaust passage 20 is provided with a preceding catalytic converter 60 and divided into a couple of branch exhaust passages 61a and 61b which are disposed to be downstream of the preceding catalytic converter 60 so as to constitute an exhaust gas discharging device. The branch exhaust passage 61a is provided with a main catalytic converter 63a, a fixed silencer 64a having constant exhaust resistance, and a variable silencer 65a including a butterfly valve 73a and having variable exhaust resistance. Similarly, the branch exhaust passage 61b is provided with a main catalytic converter 63b, a fixed silencer 64b having constant exhaust resistance, and a variable silencer 65b including a butterfly valve 73b and having variable exhaust resistance.

Figure 3:
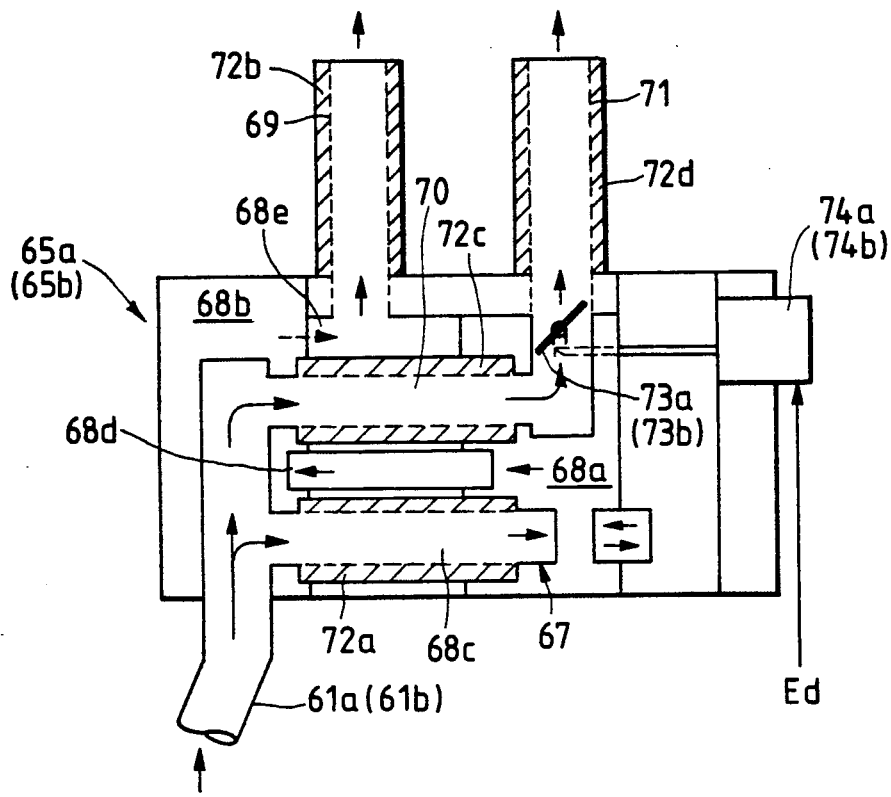
FIG. 3 is a schematic illustration used for explaining a variable silencer employed in the first embodiment shown in FIG. 2.

As shown in FIG. 3, each of the variable silencers 65a and 65b has a main expansion passage 67 and an auxiliary direct passage 70 coupled in parallel with the main expansion passage 67. The main expansion passage 67 comprises first and second expansion chambers 68a and 68b, a first passage 68c for guiding the exhaust gas from a portion of the branch exhaust passage 61a or 61b to the first expansion chamber 68a, a second passage 68d for guiding the exhaust gas from the first expansion chamber 68a to the second expansion chamber 68b, and a third passage 68e for guiding the exhaust gas from the second expansion chamber 68b to a discharging passage 69. The first passage 68c and the discharging passage 69 are provided with sound absorbing members 72a and 72b, respectively.

In the main expansion passage 67 thus formed, the exhaust gas from the portion of the branch exhaust passage 61a or 61b meanders from the first passage 68c to the discharging passage 69 to pass through the sound absorbing members 72a and 72b and to expand in the first and second expansion chambers 68a and 68b, so that exhaust sound emanating from the discharging passage 69 is restricted.

The auxiliary direct passage 70 is operative to guide the exhaust gas from the portion of the branch exhaust passage 61a or 61b to a discharging passage 71 directly. The auxiliary direct passage 70 and the discharging passage 71 are provided with sound absorbing members 72c and 72d, respectively, so as to restrict exhaust sound emanating from the discharging passage 71.

The butterfly valves 73a and 73b are driven by pressure responsive actuators 74a and 74b, respectively. In the variable silencer 65a, the exhaust gas from the portion of the branch exhaust passage 61a is discharged through only the main expansion passage 67 from the discharging passage 69 so that the exhaust sound emanating from the discharging passage 69 is reduced sufficiently when the butterfly valve 73a is closed, and a relatively large amount of exhaust gas from the portion of the branch exhaust passage 61a is discharged through both the main expansion passage 67 and the auxiliary direct passage 70 from the discharging passages 69 and 71 so that the exhaust sound, especially, high frequency components thereof emanating from the discharging passage 69 is reduced when the butterfly valve 73a is opened. The variable silencer 65a is operative to provide relatively large exhaust resistance when the butterfly valve 73a is closed because the exhaust gas passes through only the main expansion passage 67 and to provide also relatively small exhaust resistance when the butterfly valve 73a is opened because the exhaust gas passes through both the main expansion passage 67 and the auxiliary direct passage 70 provided in parallel with each other.

Similarly, in the variable silencer 65b, the exhaust gas from the portion of the branch exhaust passage 61b is discharged through only the main expansion passage 67 from the discharging passage 69 so that the exhaust sound emanating from the discharging passage 69 is reduced sufficiently when the butterfly valve 73b is closed, and a relatively large amount of exhaust gas from the portion of the branch exhaust passage 61bis discharged through both the main expansion passage 67 and the auxiliary direct passage 70 from the discharging passages 69 and 71 so that the exhaust sound, especially, high frequency components thereof emanating from the discharging passage 69 is reduced when the butterfly valve 73b is opened. The variable silencer 65b is operative to provide relatively large exhaust resistance when the butterfly valve 73b is closed because the exhaust gas passes through only the main expansion passage 67 and to provide also relatively small exhaust resistance when the butterfly valve 73b is opened because the exhaust gas passes through both the main expansion passage 67 and the auxiliary direct passage 70 provided in parallel with each other.

With the variable silencers 65a and 65b arranged as mentioned above, the exhaust discharging device constituted by the branch exhaust passages 61a and 61b is provided with variable exhaust resistance to the exhaust gas flowing through the exhaust passage 20, and the butterfly valves 73a and 73b and the pressure responsive actuators 74a and 74b for driving the butterfly valves 73a and 73b respectively constitute a exhaust resistance changing device. The pressure responsive actuators 74a and 74b are controlled by the control unit 80.

Figure 4:
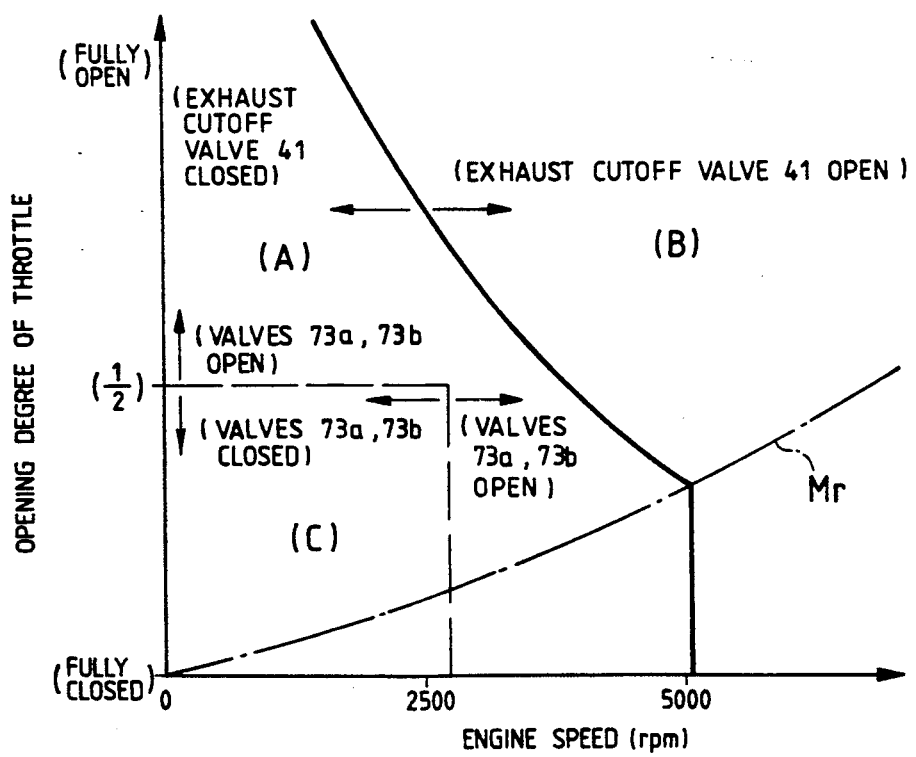
FIG. 4 is a characteristic chart used for explaining the operation of the first embodiment shown in FIG. 2.

The control unit 80 is supplied with detection output signals Sa, St, Sp and Sn obtained from the air flow sensor 81 for detecting intake air mass flow in the intake passage 10, a throttle sensor 82 for detecting opening degree of the throttle valve 15 (opening degree of throttle), an air pressure sensor 83 for detecting air pressure at a position downstream of the surge chamber 16 in the intake passage 10, and an engine speed sensor 84 for detecting the engine speed, respectively, and operative to produce control signals Ea, Eb, Ec and Ed selectively based on the detection output signals Sa, St, Sp and Sn and to supply the three-way solenoid valve 57a with the control signal Ea, the three-way solenoid valve 56a with the control signal Eb, the three-way solenoid valve 46a with the control signal Ec, and the pressure responsive actuators 74a and 74b with the control signal Ed, so as to control each of the intake air relief valve 53, intake air cut valve 51, exhaust cutoff valve 41, and butterfly valves 73a and 73b, in accordance with, for example, a characteristic chart for an operating condition of the engine 1 shown in FIG. 4. The characteristic chart of FIG. 4 shows supercharger operating areas (A) and (B) and a small exhaust gas flow area (C) included in the supercharger operating area (A) on a coordinate plane defined by an axis of abscissa representing engine speed and an axis of ordinate representing engine load embodied by, for example, opening degree of throttle and stored in the form of data map in a memory contained in the control unit 80. The supercharger operating area (A) corresponds to an operating condition of the engine 1 in which the exhaust gas flow in the exhaust passage 20 is less than a first predetermined value EVa, the supercharger operating area (B) corresponds to an operating condition of the engine 1 in which the exhaust gas flow in the exhaust passage 20 is equal to or more than the first predetermined value EVa, and the small exhaust gas flow area (C) corresponds to an operating condition of the engine 1 in which the exhaust gas flowing the exhaust passage 20 is less than a second predetermined value EVb which is smaller than the first predetermined value EVa. A road load line Mr is also shown in the characteristic chart of FIG. 4.

When the operating condition of the engine 1 resides in the supercharger operating area (A), the control unit 80 is operative to close the exhaust cutoff valve 41 so that the exhaust gas is not supplied to the turbine 32a of the secondary turbosupercharger 32 but supplied collectively to the turbine 31a of the primary turbosupercharger 31 and only the primary turbosupercharger 31 works for supercharging the engine 1, and to close the intake air cutoff valve 51 so that air compressed by the blower 31b of the first turbosupercharger 31 in the first branch intake passage 11 is prevented from flowing backward into the second branch intake passage 12. Further, the control unit 80 is operative to open the intake air relief valve 53 to relieve air so that air surge in the intake passage 10 is prevented from arising. In such a situation, the exhaust bypass valve 43 is kept closed because air pressure which is applied to the pressure chamber of the diaphragm actuator 47 from the portion of the first branch intake passage 11 downstream of the blower 31b is lower than a predetermined value and the waste gate valve 45 is controlled by air pressure applied to the pressure chamber of the diaphragm actuator 47 from the portion of the first branch intake passage 11 downstream of the blower 31b.

When the operating condition of the engine 1 resides in the supercharger operating area (B), the control unit 80 is operative first to close the intake air relief valve 53. In process of this, before the intake air relief valve 53 is closed, the exhaust bypass valve 43 is opened when the air pressure which is applied to the pressure chamber of the diaphragm actuator 47 from the portion of the first branch intake passage 11 downstream of the blower 31b becomes higher than the predetermined value and thereby the exhaust gas is supplied slightly to the turbine 32a of the secondary turbosupercharger 32 through the exhaust bypass passage 42 under a condition in which the intake air relief valve 53 is open. This results in that the turbine 32a is driven to rotate by the exhaust gas flowing through the exhaust bypass passage 42 so that the secondary turbosupercharger 32 is subjected to its preliminary rotation before the exhaust cutoff valve 41 is opened.

After that, the control unit 80 is operative to open the exhaust cutoff valve 41 and then to open the intake air cutoff valve 51, so that the turbine 31a of the primary turbosupercharger 31 and the turbine 32a of the secondary turbosupercharger 32 are driven to rotate by the exhaust gas passing through the first and second separated exhaust passages 21 and 22 respectively and thereby both the primary and secondary turbosuperchargers 31 and 32 are caused to turbosupercharger 32 is improved and torque shock arising on the engine 1 is sufficiently suppressed when the secondary turbosupercharger 32 commences to work for supercharging the engine 1.

Further, when the operating condition of the engine 1 resides in the small exhaust gas flow area (C), the control unit 80 is operative to close both the butterfly valves 73a in the variable silencer 65a and the butterfly valves 73b in the variable silencer 65b, so that the variable silencer 65a provides the relatively large exhaust resistance to the exhaust gas passing therethrough to be discharged and the variable silencer 65b also provides the relatively large exhaust resistance to the exhaust gas passing therethrough to be discharged.

On the other hand, when the operating condition of the engine 1 resides in areas other than the small exhaust gas flow area (C), the control unit 80 is operative to open both the butterfly valves 73a in the variable silencer 65a and the butterfly valves 73b in the variable silencer 65b, so that the variable silencer 65a provides the relatively small exhaust resistance to the exhaust gas passing therethrough to be discharged and the variable silencer 65b also provides the relatively small exhaust resistance to the exhaust gas passing therethrough to be discharged.

Figure 5:
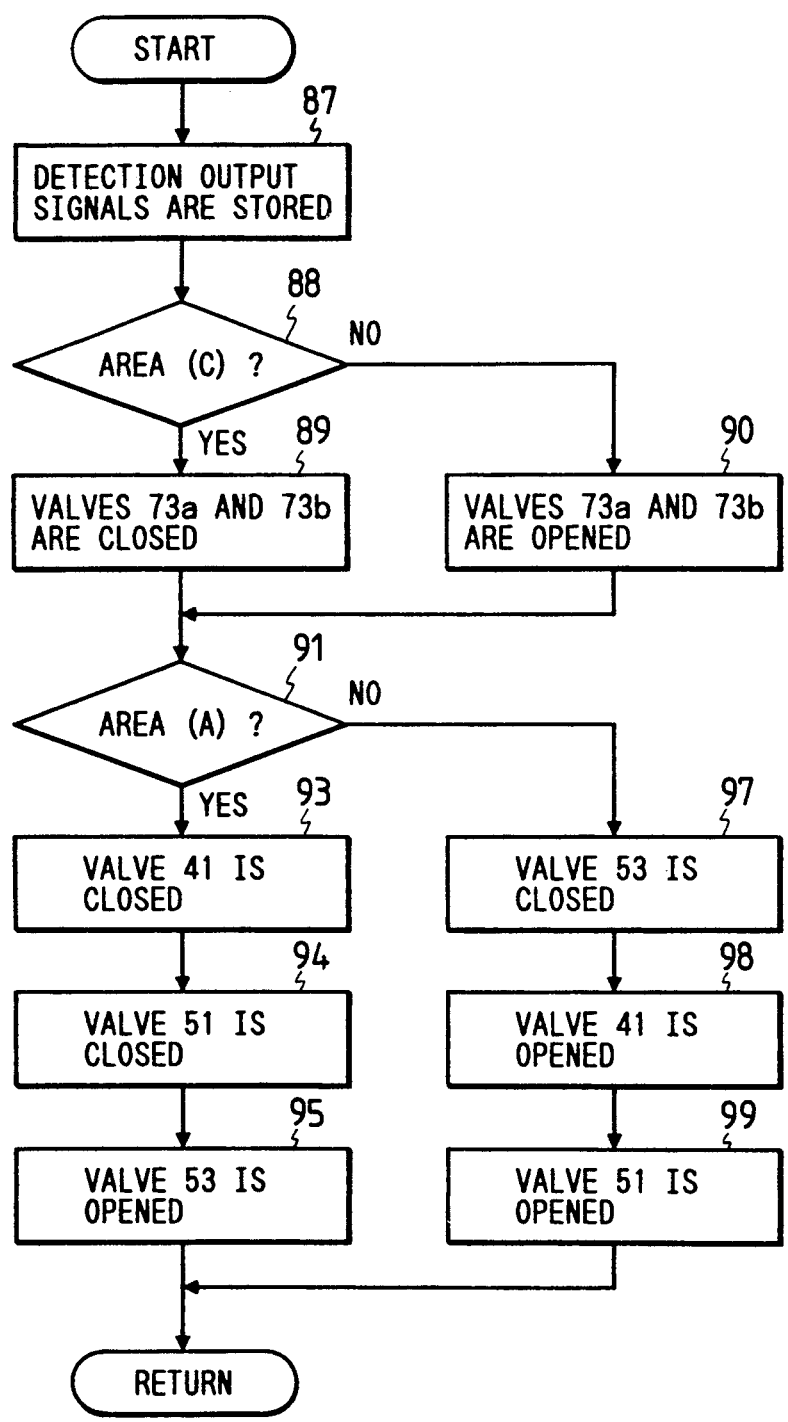
FIG. 5 is a flow chart used for explaining the operation of the first embodiment shown in FIG. 2.

One example of an operation program for controlling the exhaust cutoff valve 41, intake air cutoff valve 51, intake air relief valve 53, and the butterfly valves 73a and 73b as described above is carried out in the control unit 80 in accordance with a flow chart shown in FIG. 5.

According to the flow chart shown in FIG. 5, first, in step 87, the detection output signals Sa, St, Sp and Sn obtained from the sensors 81, 82, 83 and 84, respectively, are stored. Then, in step 88, it is checked whether the operating condition of the engine 1 resides in the small exhaust gas flow area (C) or not, based on the detection output signal St representing the engine load embodied by the opening degree of throttle and the detection output signal Sn representing the engine speed. If the operating condition of the engine 1 resides in the small exhaust gas flow area (C), the control signal Ed is supplied to the pressure responsive actuators 74a and 74b so as to close the butterfly valves 73a and 73b, in step 89, and then the process advances to step 91. To the contrary, if the operating condition of the engine 1 does not reside in the small exhaust gas flow area (C), the control signal Ed, which is different in polarity, for example, from the control signal Ed sent out in the step 89, is supplied to the pressure responsive actuators 74a and 74b so as to open the butterfly valves 73a and 73b, in step 90, and then the process advances to the step 91.

Then, in the step 91, it is checked whether the operating condition of the engine 1 resides in the supercharger operating area (A) or not, based on the detection output signals St and Sn. If the operating condition of the engine 1 resides in the supercharger operating area (A), the control signal Ec is supplied to the three-way solenoid valve 46a so as to close the exhaust cutoff valve 41, in step 93, and the control signal Eb is supplied to the three-way solenoid valve 56a so as to close the intake air cutoff valve 51, in step 94. Further, the control signal Ea is supplied to the three-way solenoid valve 57a so as to open the intake air relief valve 53, in step 95, and then the process returns to the step 87.

If it is clarified in the step 91 that the operating condition of the engine 1 does not reside in the supercharger operating area (A), that is, the operating condition of the engine 1 resides in the supercharger operating area (B), the control signal Ea is supplied to the three-way solenoid valve 57a so as to close the intake air relief valve 53, in step 97, and the control signal Ec is supplied to the three-way solenoid valve 46a so as to open the exhaust cutoff valve 41, in step 98. Further, the control signal Eb is supplied to the three-way solenoid valve 56a so as to open the intake air cutoff valve 51, in step 99, and then the process returns to the step 87.

Figure 6:
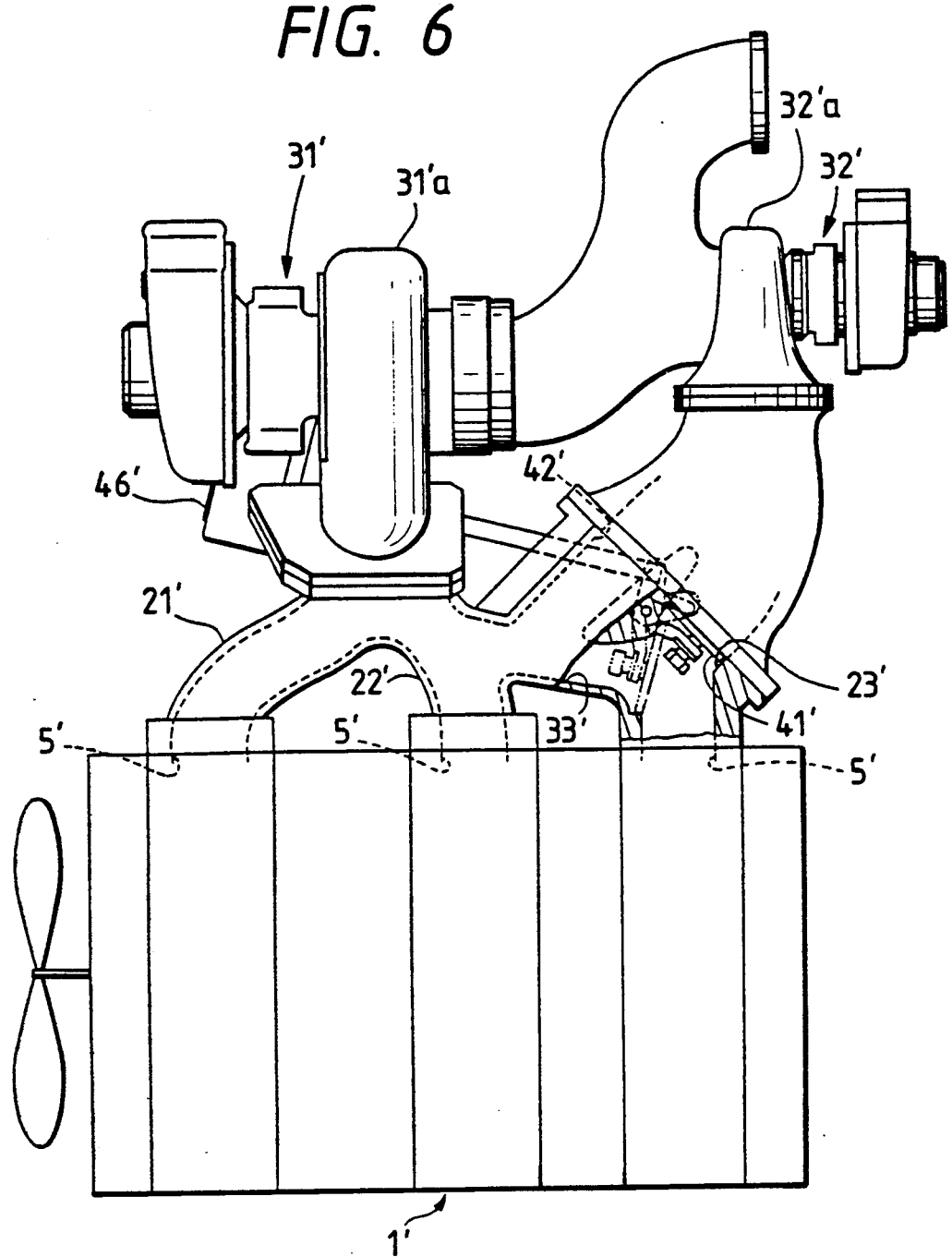
FIG. 6 is a schematic plan view showing a portion of a second embodiment of air supply and exhaust control system for an internal combustion engine according to the present invention, together with a part of an engine to which the second embodiment is applied.

FIG. 6 illustrates a part of a second embodiment of air supply and exhaust control system according to the present invention, together with a part of an engine to which the second embodiment is applied.

Referring to FIG. 6, an internal combustion engine 1', which is a rotary engine having three rotors each forming operating chambers for carrying out air suction, compression, explosion and exhaust strokes in a housing, is provided with three exhaust port 5' for discharging exhaust gas from the operating chambers for the exhaust stroke formed by three rotors, respectively.

The exhaust ports 5' are connected respectively to first, second and third separated exhaust passages 21', 22' and 23'. The first and second separated exhaust passages 21' and 22' are incorporated with each other to be coupled with a turbine housing 31'a of a primary turbosupercharger 31' which is arranged to be relatively large in supercharging capacity, and the third separated exhaust passage 23' is coupled with a turbine housing 32'a of a secondary turbosupercharger 32' which is arranged to be relatively small in supercharging capacity. The second and third separated exhaust passages 22' and 23' are interconnected through a communicating passage 33'. An exhaust bypass passage 42' branches from the communicating passage 33' to be connected with the turbine housing 32'a of the secondary turbosupercharger 32'.

Figure 7:
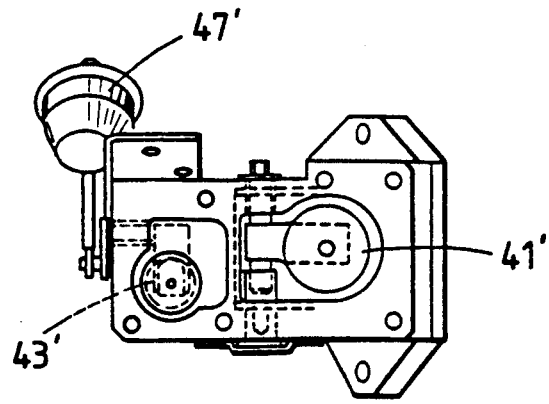
FIG. 7 is a schematic side view showing a portion of an exhaust passage of the engine shown in FIG. 6.

As shown in FIGS. 6 and 7, the third separated exhaust bypass passage 23' is provided with an exhaust cutoff valve 41' of the swing type. The exhaust cutoff valve 41' is driven by an actuator 46' to be operative to close the third separated exhaust passage 23' by taking a closing position as shown with solid lines in FIG. 6 and to open the third separated exhaust passage 23' and close the communicating passage 33' by taking an opening position as shown with broken lines in FIG. 6. Further, the exhaust bypass passage 42' is provided with an exhaust bypass valve 43' of the swing type which is driven by an actuator 47'.

Other portions of the second embodiment are arranged in the same manner as those of the first embodiment shown in FIG. 2, and illustration and detailed description thereof are omitted.

Figure 8:
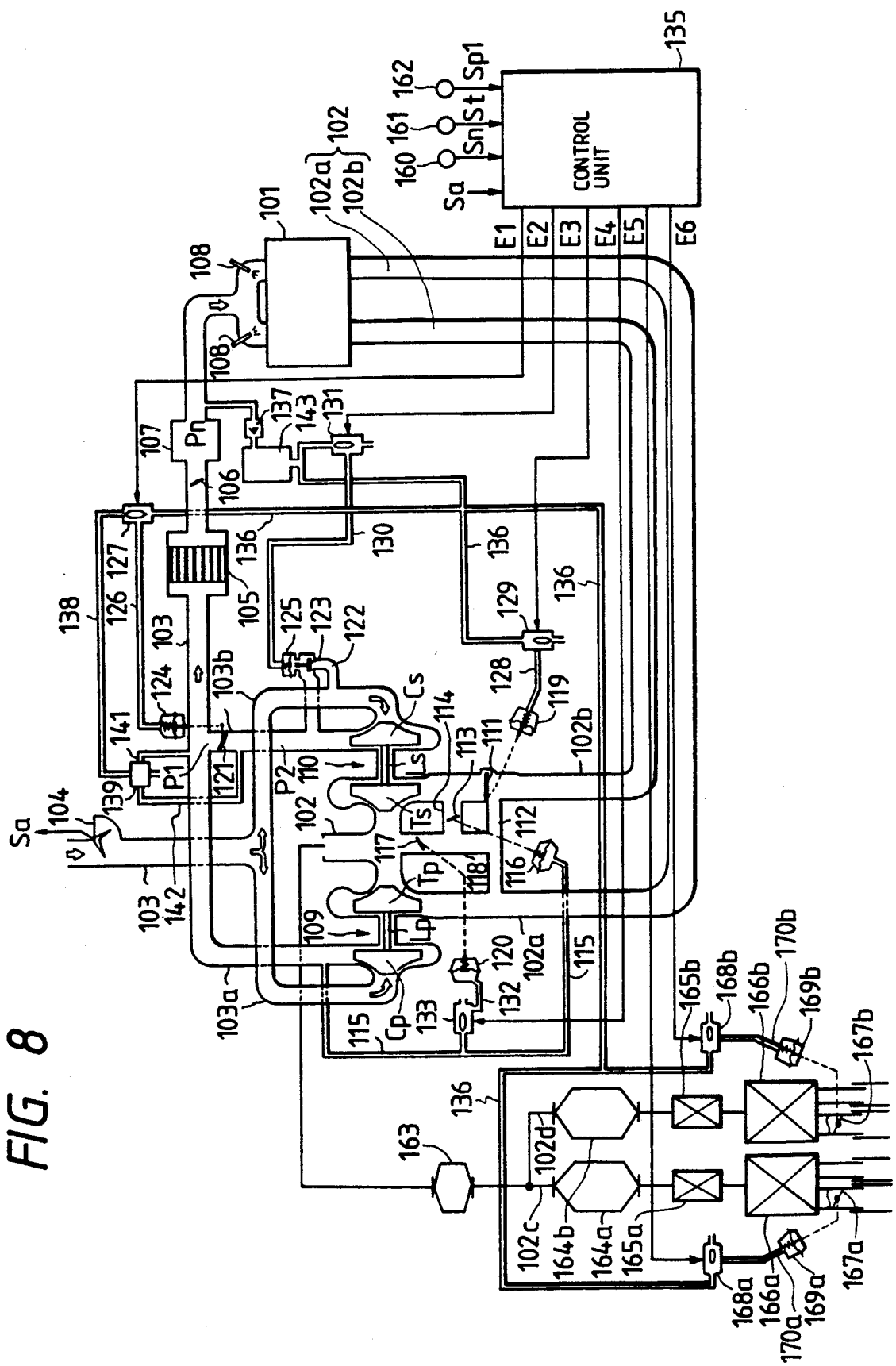
FIG. 8 is a schematic illustration showing a third embodiment of air supply and exhaust control system for an internal combustion engine according to the present invention, together with essential parts of an engine to which the third embodiment is applied.

FIG. 8 illustrates a third embodiment of air supply and exhaust control system according to the present invention, together with a part of an engine to which the third embodiment is applied.

Referring to FIG. 8, an internal combustion engine 101, which is, for example, a rotary engine having a couple of rotors each forming an operating chamber having the capacity of, for example, 654 cubic centimeters, is provided with an exhaust passage 102 for discharging exhaust gas from the engine 101 and an intake passage 103 for supplying the engine 101 with intake air. The exhaust passage 102 includes first and second separated exhaust passages 102a and 102b, and the intake passage 103 includes first and second branch intake passages 103a and 103b which are separated from each other at a position downstream of an air flow sensor 104 provided for detecting intake air mass flow in the intake passage 103 and merged into each other at a location upstream of an intercooler 105 provided for cooling the intake air in the intake passage 103. A portion of the intake passage 103 downstream of the intercooler 105 is provided with a throttle valve 106, a surge chamber 107 and fuel injectors 108.

A primary turbosupercharger 109 is provided with a turbine Tp disposed in the first separated exhaust passage 102a to be driven to rotate by the exhaust gas and a blower Cp disposed in the first branched intake passage 103a and coupled through a rotating shaft Lp with the turbine Tp. A secondary turbosupercharger 110 is also provided with a turbine Ts disposed in the second separated exhaust passage 102b to be driven to rotate by the exhaust gas and a blower Cs disposed in the second branched intake passage 103b and coupled through a rotating shaft Ls with the turbine Ts.

A portion of the first branched intake passage 103a upstream of the blower Cp and a portion of the second branched intake passage 103b upstream of the blower Cs are arranged in a line to form a branched portion, so that pressure waves produced in one of the first and second branched intake passages 103a and 103b are easy to propagate to the other of the first and second branched intake passages 103a and 103b but hard to propagate toward the air flow sensor 104.

An exhaust cutoff valve 111 is disposed in a portion of the second separated exhaust passage 102b upstream of the turbine Ts. This exhaust cutoff valve 111 is operative to close the second separated exhaust passage 102b in order to prevent the exhaust gas from being supplied to the turbine Ts so that only the primary turbosupercharger 109 works in a situation where intake air mass flow supplied to the engine 101 is relatively small.

A portion of the second separated exhaust passage 102b upstream of the exhaust cutoff valve 111 is connected through a connecting passage 112 with a portion of the first separated exhaust passage 102a upstream of the turbine Tp. The connecting passage 112 is also connected with a portion of the exhaust passage 102 downstream of the turbines Tp and Ts through a bypass passage 118 in which a waste gate valve 117 is provided. A portion of the bypass passage 118 upstream of the waste gate valve 117 is connected with a portion of the second separated exhaust passage 102b between the exhaust cutoff valve 111 and the turbine Ts through an exhaust bypass passage 114 in which an exhaust bypass valve 113 is provided.

The exhaust bypass valve 113 is driven by a diaphragm actuator 116 and a pressure chamber of the diaphragm actuator 116 is coupled through a control pressure pipe 115 with a portion of the first branched intake passage 103a downstream of the blower Cp.

An intake air cutoff valve 121 is disposed in a portion of the second branched intake passage 103b downstream of the blower Cs. The second branched intake passage 103b is provided also with an intake air relief passage 122 detouring the turbine Ts and having therein an intake air relief valve 123. The intake air cutoff valve 121 is driven by a diaphragm actuator 124, and the intake air relief valve 123 is driven by a diaphragm actuator 125.

A control pressure pipe 126 extending from the diaphragm actuator 124 for driving the intake air cutoff valve 121 is connected with an output port of a three-way solenoid valve 127, and a control pressure pipe 128 extending from a diaphragm actuator 119 for driving the exhaust cutoff valve 111 is connected with an output port of a three-way solenoid valve 129. Further, a control pressure pipe 130 extending from the diaphragm actuator 125 for driving the intake air relief valve 123 is connected with an output port of a three-way solenoid valve 131, and a control pressure pipe 132 extending from a diaphragm actuator 120 for driving the waste gate valve 117 is connected with an output port of a three-way solenoid valve 133. The three-way solenoid valves 127, 129, 131 and 133 are controlled by a control unit 135 constituted by a microcomputer.

A downstream portion of the exhaust passage 102 is provided with a preceding catalytic converter 163 and divided into a couple of branch exhaust passages 102c and 102d which are disposed to be downstream of the preceding catalytic converter 163 so as to constitute an exhaust gas discharging device. The branch exhaust passage 102c is provided with a main catalytic converter 164a, a fixed silencer 165a having constant exhaust resistance, and a variable silencer 166a including a butterfly valve 167a and having variable exhaust resistance. Similarly, the branch exhaust passage 102d is provided with a main catalytic converter 164b, a fixed silencer 165b having constant exhaust resistance, and a variable silencer 166b including a butterfly valve 167b and having variable exhaust resistance. The butterfly valves 167a and 167b are driven by diaphragm actuators 169a and 169b, respectively.

A control pressure pipe 170a extending from the diaphragm actuator 169a for driving the butterfly valve 167a is connected with an output port of a three-way solenoid valve 168a, and a control pressure pipe 170b extending from the diaphragm actuator 169b for driving the butterfly valve 167b is connected with an output port of a three-way solenoid valve 168b. The three-way solenoid valves 168a and 168b are controlled by the control unit 135.

Each of the variable silencers 166a and 166b is constituted in the same manner as the variable silencer 65a or 65b which is shown in FIG. 3 and described above in detail. The variable silencer 166a is operative to provide relatively large exhaust resistance when the butterfly valve 167a is closed because the exhaust gas passes through only a main expansion passage formed therein and to provide also relatively small exhaust resistance when the butterfly valve 167a is opened because the exhaust gas passes through both the main expansion passage and an auxiliary direct passage formed in parallel with the main expansion passage, and similarly the variable silencer 166b is operative to provide relatively large exhaust resistance when the butterfly valve 167b is closed because the exhaust gas passes through only a main expansion passage formed therein and to provide also relatively small exhaust resistance when the butterfly valve 167b is opened because the exhaust gas passes through both the main expansion passage 67 and an auxiliary direct passage formed in parallel with the main expansion passage. With the variable silencers 166a and 166b, the exhaust discharging device constituted by the branch exhaust passages 102c and 102d is provided with variable exhaust resistance to the exhaust gas flowing through the exhaust passage 102, and the butterfly valves 167a and 167b, the diaphragm actuators 169a and 169b for driving the butterfly valves 167a and 167b respectively, and the three-way solenoid valves 168a and 168b connected to the diaphragm actuators 169a and 169b constitute an exhaust resistance changing device.

The control unit 135 is provided with detection output signals Sa, Sn, St and Sp1 obtained from the air flow sensor 104, an engine speed sensor 160 for detecting the engine speed, a throttle sensor 161 for detecting opening degree of the throttle valve 106 (opening degree of throttle), and an air pressure sensor 163 for detecting an air pressure P1 at a portion downstream of the blower Cp in the first branch intake passage 103a, respectively, and operative to produce control signals E1, E2, E3, E4, E5 and E6 selectively based on the detection output signals Sa, Sn, St and Sp1 and to supply the three-way solenoid valve 127 with the control signal E1, the three-way solenoid valve 131 with the control signal E2, the three-way solenoid valve 129 with the control signal E3, the three-way solenoid valve 133 with the control signal E4, the three-way solenoid valve 168a with the control signal E5, and the three-way solenoid valve 168b with the control signal E6.

One of input ports of the three-way solenoid valve 129 is open to the atmosphere and the other of the input ports is connected through a pipe 136 with a negative pressure tank 143 to which negative pressure Pn at a portion downstream of the throttle valve 106 in the intake passage 103 is supplied through a check valve 137 One of input ports of the three-way solenoid valve 127 is connected through the pipe 136 with the negative pressure tank 143 and the other of the input ports is connected through a pipe 138 with a pressure difference detecting valve 139. One of input ports of the three-way solenoid valve 168a is open to the atmosphere and the other of the input ports is connected through the pipe 136 with the negative pressure tank 143, and one of input ports of the three-way solenoid valve 168b is open to the atmosphere and the other of the input ports is connected through the pipe 136 with the negative pressure tank 143.

Figure 9:
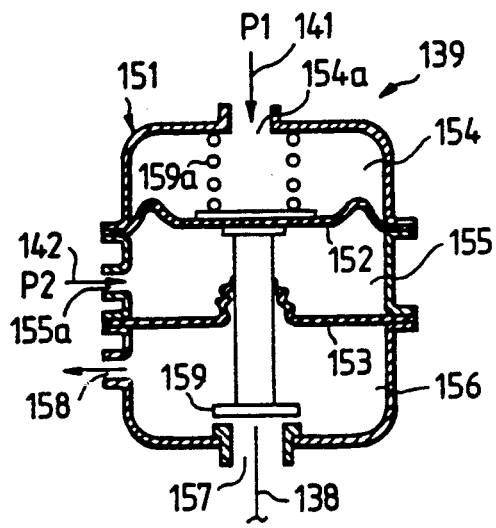
FIG. 9 is a schematic illustration showing a pressure difference detecting valve employed in the third embodiment shown in FIG. 8.

As shown in FIG. 9, the pressure difference detecting valve 139 has a housing 151 in which three chambers 154, 155 and 156 are formed with diaphragms 152 and 153. The chambers 154 and 155 are provided with input ports 154a and 155a, respectively, and the chamber 156 is provided with an open port 158 and an output port 157 connected with the pipe 138. The input port 154a is connected through a pipe 141 with the portion of the first branched intake passage 103a downstream of the blower Cp so as to be supplied with the air pressure P1, and the input port 155a is connected through a pipe 142 with a portion of the second branched intake passage 103b upstream of the intake air cutoff valve 121 so as to be supplied with an air pressure P2 at a portion upstream of the intake air cutoff valve 121 in the second branched intake passage 103b.

The pressure difference detecting valve 139 is provided further with a valve body 159 connected with the diaphragms 152 and 153 and biased by a spring 159a disposed in the chamber 154. This valve body 159 is operative to keep the output port 157 open so as to open the chamber 156 to the atmosphere when a pressure difference between the air pressures P1 and P2 is relatively large and to keep the output port 157 closed when the pressure difference between the air pressures P1 and P2 is equal to or smaller than a predetermined pressure value ΔP. Accordingly, when the control pressure pipe 126 is communicated with the pipe 138 through the three-way solenoid valve 127 caused to be in the ON state by the control signal E1 and the pressure difference between the air pressures P1 and P2 is larger than the predetermined pressure value ΔP, the diaphragm actuator 124 is opened to the atmosphere and thereby the intake air cutoff valve 121 is opened. On the other hand, when the control pressure pipe 126 is communicated with the pipe 136 through the three-way solenoid valve 127 caused to be in the OFF state by the control signal E1, the negative pressure Pn is applied to the diaphragm actuator 124 and thereby the intake air cutoff valve 121 is closed.

When the control pressure pipe 128 is communicated with the pipe 136 through the three-way solenoid valve 129 caused to be in the OFF state by the control signal E3, the negative pressure Pn is applied to the diaphragm actuator 119 and thereby the exhaust cutoff valve 111 is closed, so that only the primary turbosupercharger 109 is caused to work. On the other hand, when the control pressure pipe 128 is opened to the atmosphere through the three-way solenoid valve 129 caused to be in the ON state by the control signal E3, the exhaust cutoff valve 111 is opened and thereby the secondary turbosupercharger 110 is caused to work.

The three-way solenoid valve 131 has its input ports, one of which is opened to the atmosphere and the other of which is connected with the negative pressure tank 143. In the case where the engine speed is relatively low, the negative pressure Pn is applied through the three-way solenoid valve 131 caused to be in the ON state by the control signal E2 and the control pressure pipe 130 to the intake air relief valve 123 and whereby the intake air relief valve 123 is kept open for keeping the intake air relief passage 122 open. Then, the three-way solenoid valve 131 is changed to be in the OFF state by the control signal E2 to make the control pressure pipe 130 open to the atmosphere, so that the intake air relief valve 123 is closed for shutting the intake air relief passage 122.

The air pressure P1 is applied through the control pressure pipe 115 extending from the diaphragm actuator 116 to one of input ports of the three-way solenoid valve 133. When the engine speed and the intake air mass flow are equal to or more than respective predetermined values and the air pressure P1 is equal to or higher than a predetermined pressure value, the three-way solenoid valve 133 is caused to be in the ON state by the control signal E4 so as to apply the air pressure P1 to the diaphragm actuator 120 and thereby the diaphragm actuator 120 causes the waste gate valve 117 to be open for making the bypass passage 118 open. The other of input ports of the three-way solenoid valve 133 is opened to the atmosphere and the waste gate valve 117 is closed for shutting the bypass passage 118 when the diaphragm actuator 120 is opened to the atmosphere through the three-way solenoid valve 133 caused to be in the OFF state by the control signal E4.

When the control pressure pipe 170a is communicated with the pipe 136 through the three-way solenoid valve 168a caused to be in the OFF state by the control signal E5, the negative pressure Pn is applied to the diaphragm actuator 169a and thereby the butterfly valve 167a is closed, so that the variable silencer 166a provides the relatively large exhaust resistance to the exhaust gas passing therethrough. On the other hand, when the control pressure pipe 170a is opened to the atmosphere through the three-way solenoid valve 168a caused to be in the ON state by the control signal E5, the butterfly valve 167a is opened and thereby the variable silencer 166a provides the relatively small exhaust resistance to the exhaust gas passing therethrough.

Further, when the control pressure pipe 170b is communicated with the pipe 136 through the three-way solenoid valve 168b caused to be in the OFF state by the control signal E6, the negative pressure Pn is applied to the diaphragm actuator 169b and thereby the butterfly valve 167b is closed, so that the variable silencer 166a provides the relatively large exhaust resistance to the exhaust gas passing therethrough. On the other hand, when the control pressure pipe 170b is opened to the atmosphere through the three-way solenoid valve 168b caused to be in the N state by the control signal E6, the butterfly valve 167b is opened and thereby the variable silencer 166a provides the relatively small exhaust resistance to the exhaust gas passing therethrough.

Figure 11:
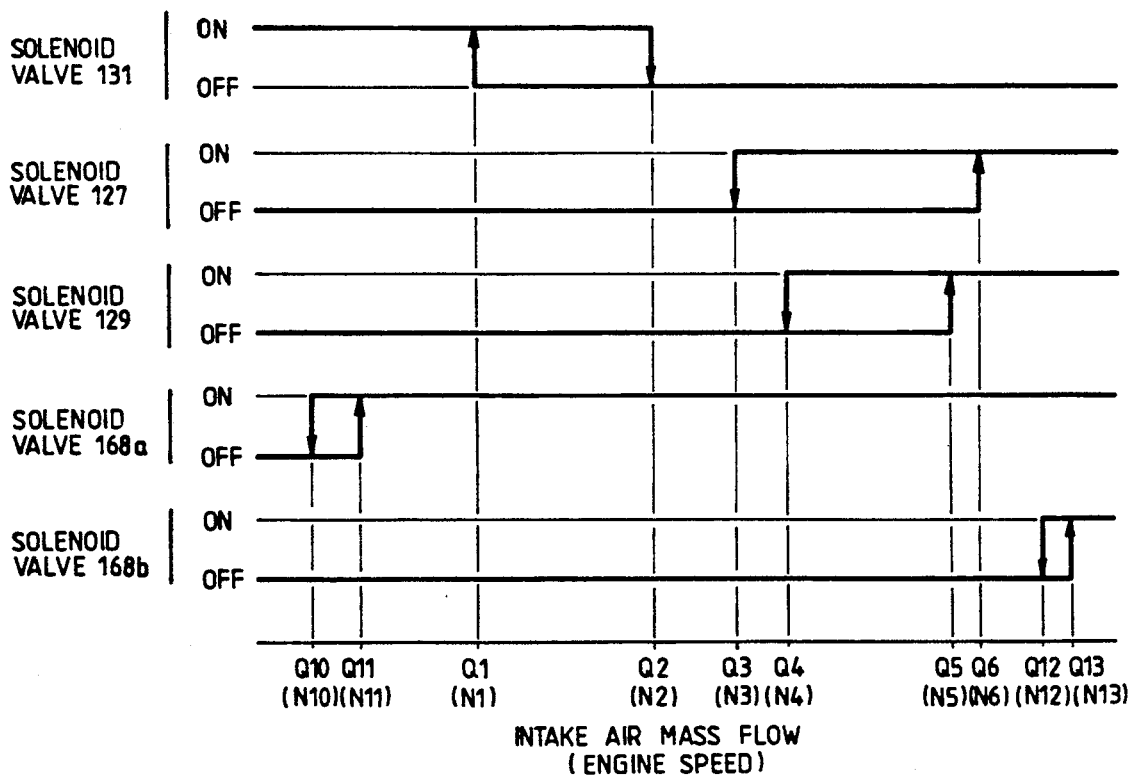
FIGS. 10 and 11 are characteristic charts used for explaining the operation of various valves employed in the third embodiment shown in FIG. 8.
Figure 10:
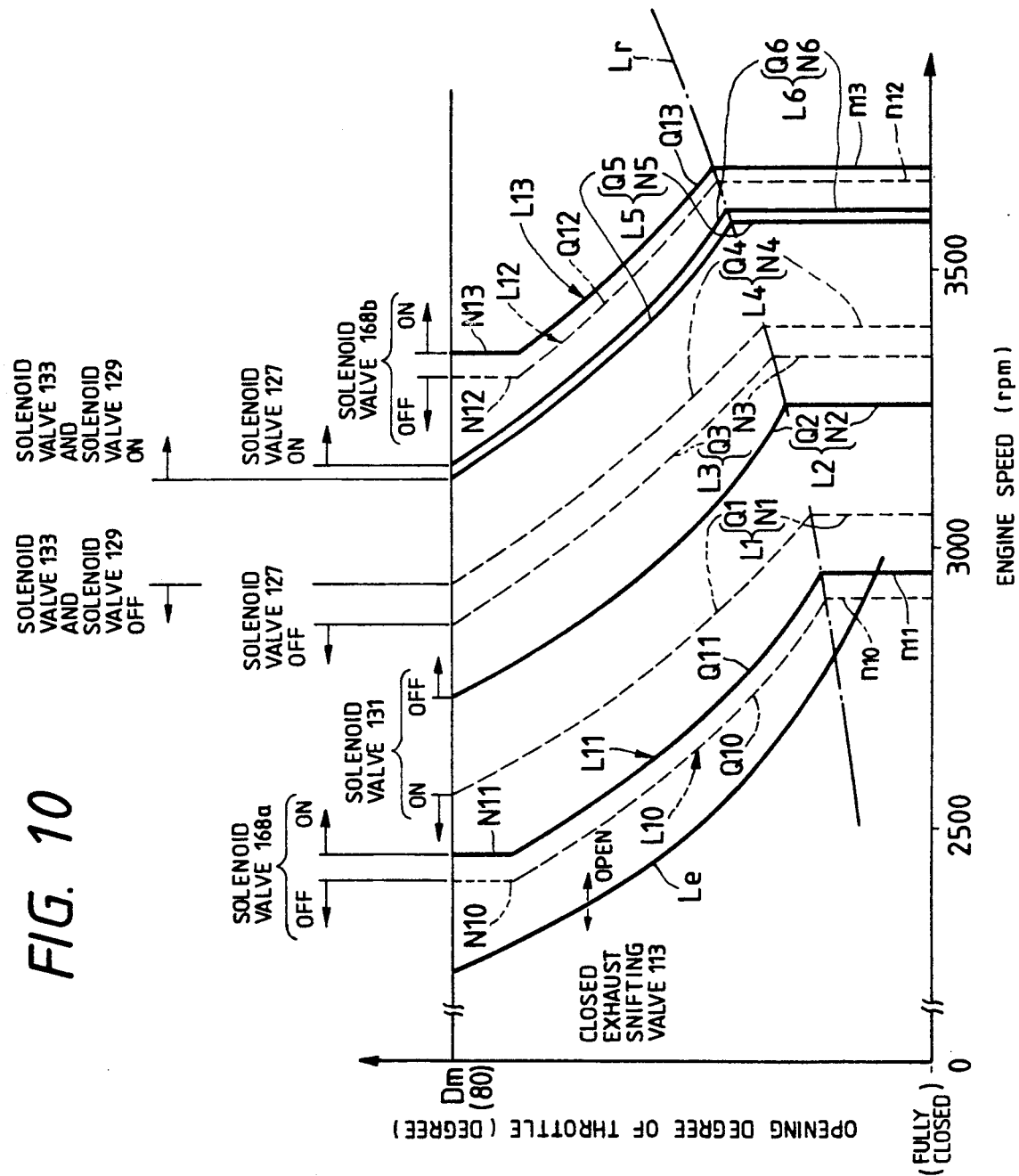

FIG. 10 is a characteristic chart showing the operating conditions of the exhaust bypass valve 113 and the three-way solenoid valves 127, 129, 131, 133, 168a and 168b for controlling the intake air cutoff valve 121, exhaust cutoff valve 111, intake air relief valve 123, waste gate valve 117, and butterfly valves 167a and 167b, respectively. This characteristic chart of FIG. 10 has an axis of abscissa representing engine speed and an axis of ordinate representing engine load embodied by opening degree of throttle, the maximum value of which is indicated by Dm, and is stored in the form of data map in a memory contained in the control unit 135. Further, FIG. 11 is a characteristic chart showing the operating conditions of the three-way solenoid valves 131, 127, 129, 168a and 168b. The characteristic chart of FIG. 11 has an axis of abscissa representing intake air mass flow and engine speed.

According to the characteristic charts of FIGS. 10 and 11, the exhaust bypass valve 113 is changed to be open from closed and to be closed from open in accordance with a line Le in common. On the other hand, the three-way solenoid valve 131 is changed into, the ON state from the OFF state for causing the intake air relief valve 123 to be open from closed in accordance with a line L1 which indicates the operating condition of engine in which the engine 101 operates with intake air mass flow Q1 and the operating condition of engine in which the engine 101 operates at engine speed N1, and into the OFF state from the ON state for causing the intake air relief valve 123 to be closed from open in accordance with a line L2 which indicates the operating condition of engine in which the engine 101 operates with intake air mass flow Q2 and the operating condition of engine in which the engine 101 operates a engine speed N2. The three-way solenoid valve 127 is changed into the OFF state from the ON state for causing the intake air cutoff valve 121 to be closed from open in accordance with a line L3 which indicates the operating condition of engine in which the engine 101 operates with intake air mass flow Q3 and the operating condition of engine in which the engine 101 operates at engine speed N3, and into the ON state from the OFF state for causing the intake air cutoff valve 121 to be open from closed in accordance with a line L6 which indicates the operating condition of engine in which the engine 101 operates with intake air mass flow Q6 and the operating condition of engine in which the engine 101 operates at engine speed N6. Each of the three-way solenoid valves 129 and 133 is changed into the OFF state from the ON state for causing each of the exhaust cutoff valve 111 and the waste gate valve 117 to be closed from open in accordance with a line L4 which indicates the operating condition of engine in which the engine 101 operates with intake air mass flow Q4 and the operating condition of engine in which the engine 101 operates at engine speed N4, and into the ON state from the OFF state for causing each of the exhaust cutoff valve 111 and the waste gate valve 117 to be open from closed in accordance with a line L5 which indicates the operating condition of engine in which the engine 101 operates with intake air mass flow Q5 and the operating condition of engine in which the engine 101 operates at engine speed N5. Further, the three-way solenoid valve 168a is changed into the OFF state from the ON state for causing the butterfly valve 167a to be closed from open in accordance with a line L10 which indicates the operating condition of engine in which the engine 101 operates with intake air mass flow Q10, the operating condition of engine in which the engine 101 operates at engine speed N10 and the operating condition of engine in which the engine 101 operates at engine speed n10, and into the ON state from the OFF state for causing the butterfly valve 167a to be open from closed in accordance with a line L11 which indicates the operating condition of engine in which the engine 101 operates with intake air mass flow Q11 the operating condition of engine in which the engine 101 operates at engine speed N11 and the operating condition of engine in which the engine 101 operates at engine speed n11. The three-way solenoid valve 168b is changed into the OFF state from the ON state for causing the butterfly valve 167b to be closed from open in accordance with a line L12 which indicates the operating condition of engine in which the engine 101 operates with intake air mass flow Q12, the operating condition of engine in which the engine 101 operates at engine speed N12 and the operating condition of engine in which the engine 101 operates at engine speed n12, and into the ON state from the OFF state for causing the butterfly valve 167b to be open from closed in accordance with a line L13 which indicates the operating condition of engine in which the engine 101 operates with intake air mass flow Q13, the operating condition of engine in which the engine 101 operates at engine speed N13 and the operating condition of engine in which the engine 101 operates at engine speed n13.

On the characteristic chart of FIG. 10, an operating area having the line L6 as a lower boundary is set to correspond to the operating condition of the engine 101 in which exhaust gas flow in the exhaust passage 102 is to be equal to or more than a first predetermined value EV1, and each of an operating area between the lines L5 and L6, an operating area between the lines L2 and L5, and an operating area having the line L2 as an upper boundary is set to correspond to the operating condition of the engine 101 in which exhaust gas flow in the exhaust passage 102 is to be less than the first predetermined value EV1. Further, a road load line Lr indicates the operating condition of the engine 101 when a vehicle equipped with the engine 101 travels on a level road.

When the operating condition of the engine 101 resides in the operating area having the line L2 as an upper boundary, the control unit 135 is operative to keep each of the three-way solenoid valves 129 and 127 in the OFF state and, contrary, to keep the three-way solenoid valve 131 in the ON state, as shown in FIGS. 10 and 11, so that each of the exhaust cutoff valve 111 and the intake air cutoff valve 121 is kept closed and the intake air relief valve 123 is kept open. As a result, only the primary turbosupercharger 109 is caused to work for supercharging the engine 101.

Then, when the intake air mass flow in the engine 101 has increased to cross the line L2 and the operating condition of the engine 101 has moved into the operating area between the lines L2 and L5, the control unit 135 is operative to cause the three-way solenoid valve 131 to be in the OFF state, as shown in FIGS. 10 and 11, for closing the intake air relief valve 123. In process of this, before the intake air relief valve 123 is closed, the exhaust bypass valve 113 is opened when the intake air mass flow in the engine 101 has increased to cross the line Le, as shown in FIG. 11, and thereby the exhaust gas is supplied slightly to the turbine Ts of the secondary turbosupercharger 110 though the exhaust bypass passage 114 under a condition in which the intake air relief valve 123 is open. This results in that the turbine Ts is driven to rotate by the exhaust gas flowing through the exhaust bypass passage 114 so that the secondary turbosupercharger 110 is subjected to its preliminary rotation before the exhaust cutoff valve 111 is opened.

After that, when the intake air mass flow in the engine 101 has further increased to cross the line L5 and the operating condition of the engine 101 has moved into the operating area between the lines L5 and L6, the control unit 135 is operative to cause the three-way solenoid valve 129 to be in the ON state, as shown in FIGS. 10 and 11, for opening the exhaust cutoff valve 111, and then, when the intake air mass flow in the engine 101 has still further increased to cross the line L6 and the operating condition of the engine 101 has moved into the operating area having the line L6 as a lower boundary, the control unit 135 is operative to cause the three-way solenoid valve 127 to be in the ON state, as shown in FIGS. 10 and 11, for opening the intake air cutoff valve 121, so that the turbine Tp of the primary turbosupercharger 109 and the turbine Ts of the secondary turbosupercharger 110 are driven to rotate by the exhaust gas passing through the first and second separated exhaust passages 102a and 102b respectively and thereby both the primary and secondary turbosuperchargers 109 and 110 are caused to work for supercharging the engine 101.

As described above, when the engine 101 is accelerated and the operating condition of the engine 101 is changed into the situation wherein the exhaust gas flow in the exhaust passage 102 is equal to or more than the first predetermined value EV1 from the situation wherein the exhaust gas flow in the exhaust passage 102 is less than the first predetermined value EV1, the exhaust cutoff valve 111 is opened first then the intake air cutoff valve 121 is opened. Accordingly, the secondary turbosupercharger 110 is subjected to its preliminary rotation before the intake air cutoff valve 121 is opened and the supercharging by the secondary turbosupercharger 110 is commenced, so that backward flow of compressed air toward the secondary turbosupercharger 110 in the intake passage 103 is prevented from arising.

On the other hand, when the engine 101 is decelerated and the operating condition of the engine 101 is changed into the situation wherein the exhaust gas flow in the exhaust passage 102 is less than the first predetermined value EV1 from the situation wherein the exhaust gas flow in the exhaust passage 102 is equal to or more than the first predetermined value EV1, the intake air cutoff valve 121 is kept open until a time point after the exhaust cutoff valve 111 has been closed. Accordingly, although the turbine Ts of the secondary turbosupercharger 110 continues to rotate with the force of inertia for a certain period of time after the exhaust cutoff valve 111 has been closed, air surge in the intake passage 103 is prevented from arising.

In the third embodiment shown in FIG. 8, the intake air cutoff valve 121 is controlled to be open substantially by both the three-way solenoid valve 127 and the pressure difference detecting valve 139 and, in practice, the operation of the pressure difference detecting valve 139 results in that the intake air cutoff valve 121 is opened with a certain delay from a time point at which the three-way solenoid valve 127 is caused to be in the ON state by the control signal E1 from the control unit 135. Accordingly, it is possible to arrange the line L6 to be coincide with the line 5 on the characteristic chart of Fig. 10.

Further, on the characteristic chart of FIG. 10, an operating area having the line L11 as an upper boundary is set to correspond to the operating condition of the engine 101 in which exhaust gas flow in the exhaust passage 102 is to be less than a second predetermined value EV2 which is smaller than the first predetermined value EV1, and an operating area having the line L13 as an upper boundary is set to correspond to the operating condition of the engine 101 in which exhaust gas flow in the exhaust passage 102 is less than a third predetermined value EV3 which is larger than the first predetermined value EV1.

Accordingly, when the engine 101 is in the operating condition in which the exhaust gas flow in the exhaust passage 102 is less than the second predetermined value EV2, the control unit 135 is operative to keep each of the three-way solenoid valves 168a and 168b in the OFF state, as shown in FIGS. 10 and 11, so that both the butterfly valves 167a and 167b are kept closed. As a result, each of the variable silencers 166a and 166b has the relatively large exhaust resistance to the exhaust gas passing therethrough.

Then, when the exhaust gas flow in the exhaust passage 102 has increased and the engine 101 is in the operating condition in which the exhaust gas flow in the exhaust passage 102 is equal to or more than the second predetermined value EV2 and less than the third predetermined value EV3, the control unit 135 is operative to cause the three-way solenoid valve 168a to be in the ON state and to keep the three-way solenoid valve 168b in the OFF state, as shown in FIGS. 10 and 11, so that the butterfly valve 167a is kept open and the butterfly valve 167b is kept closed. As a result, the variable silencer 166a has the relatively small exhaust resistance to the exhaust gas passing therethrough and the variable silencer 166a still has the relatively large exhaust resistance to the exhaust gas passing therethrough.

After that, when the exhaust gas flow in the exhaust passage 102 has further increased and the engine 101 is in the operating condition in which the exhaust gas flow in the exhaust passage 102 is equal to or more than the third predetermined value EV3, the control unit 135 is operative to keep each of the three-way solenoid valves 168a and 168b in the ON state, as shown in FIGS. 10 and 11, so that both the butterfly valves 167a and 167b are kept open. As a result, each of the variable silencers 166a and 166b has the relatively small exhaust resistance to the exhaust gas passing therethrough.

Accordingly, the exhaust discharging device which is constituted by the branch exhaust passages 102c and 102d has large exhaust resistance when the exhaust gas flow in the exhaust passage 102 is less the second predetermined value EV2, medium exhaust resistance when the exhaust gas flow in the exhaust passage 102 is equal to or more than the second predetermined value EV2 and less than the third predetermined value EV3, and small exhaust resistance when the exhaust gas in the exhaust passage 102 is equal to or larger than the third predetermined value EV3.

FIGS. 12-a and 12-b show an example of a circuit constituting a part of the control unit 135 employed in the third embodiment shown in FIG. 8, which produces the control signals E1 to E6.

Referring to the FIGS. 12-a and 12-b, the detection output signal Sa from the air flow sensor 104 is supplied through an input terminal 171 to a level comparator 174 to be compared in level with an output Vq1 of an adder 181 thereat. The level comparator 174 produces a comparison output CQ1 which has a level of "1" when the detection output signal Sa is equal in level to or larger in level than the output Vq1 of the adder 181 and a level of "0" when the detection output signal Sa is lower in level than the output Vq1 of the adder 181.

On the other hand, the detection output signal Sn from the engine speed sensor 160 is supplied through an input terminal 172 to a level comparator 178 to be compared in level with an output Vn1 of an adder 185 thereat. The level comparator 178 produces a comparison output CN1 which has a level of "1" when the detection output signal Sn is equal in level to or larger in level than the output Vn1 of the adder 185 and a level of "0" when the detection output signal Sn is lower in level than the output Vn1 of the adder 185.

The comparison outputs CQ1 and CN1 are supplied to an OR gate 211 and the OR gate 211 produces an output signal R1 which has a high level when at least one of the comparison outputs CQ1 and CN1 has the level of "1" and a low level when each of the comparison outputs CQ1 and CN1 has the level of "0". The output signal R1 of the OR gate 211 is applied to each of gates 183 and 187 so that each of the gates 183 and 187 is put in the ON state when the output signal R1 of the OR gate 211 has the high level.

Accordingly, the output Vq1 of the adder 181 is composed of a reference voltage VQ1, which is obtained from a reference voltage source 182 to correspond to the intake air mass flow Q1, when the output signal R1 of the OR gate 211 has the low level and composed of the reference voltage VQ1 and a reference voltage VQ1', which is obtained from a reference voltage source 184 to correspond to a difference between the intake air mass flows Q1 and Q2, added to each other when the output signal R1 has the high level. Similarly, the output Vn1 of the adder 185 is composed of a reference voltage VN1, which is obtained from a reference voltage source 186 to correspond to the engine speed N1, when the output signal R1 of the OR gate 211 has the low level and composed of the reference voltage VN1 and a reference voltage VN1', which is obtained from a reference voltage source 188 to correspond to a difference between the engine speeds N1 and N2, added to each other when the output signal R1 has the high level.

With such an arrangement including the level comparators 174 and 178 and the OR gate 211, in the case where the operating condition of the engine 101 is changing in such a manner that each of the intake air mass flow represented by the detection output signal Sa and the engine speed represented by the detection output signal Sn increases, the level of the output signal R1 from the OR gate 211 is changed to be high from low when the operating condition of the engine 101 varies to cross the line L2 on the characteristic chart of FIG. 10, and in the case where the operating condition of the engine 101 is changing in such a manner that each of the intake air mass flow represented by the detection output signal Sa and the engine speed represented by the detection output signal Sn decreases, the output signal R1 of the OR gate 211 is changed to be low from high when the operating condition of the engine 101 varies to cross the line L1 on the characteristic chart of FIG. 10. The output signal R1 of the OR gate 211 thus obtained is used as the control signal E2 for controlling the three-way solenoid valve 131.

The detection output signal Sa is supplied also to a level comparator 175 to be compared in level with an output Vq3 of an adder 191 thereat. The level comparator 175 produces a comparison output CQ3 which has a level of "1" when the detection output signal Sa is equal in level to or larger in level than the output Vq3 of the adder 191 and a level of "0" when the detection output signal Sa is lower in level than the output Vq3 of the adder 191.

On the other hand, the detection output signal Sn is supplied also to a level comparator 179 to be compared in level with an output Vn3 of an adder 195 thereat. The level comparator 179 produces a comparison output CN3 which has a level of "1" when the detection output signal Sn is equal in level to or larger in level than the output Vn3 of the adder 195 and a level of "0" when the detection output signal Sn is lower in level than the output Vn3 of the adder 195.

The comparison outputs CQ3 and CN3 are supplied to an OR gate 212 and the OR gate 212 produces an output signal R2 which has a high level when at least one of the comparison outputs CQ3 and CN3 has the level of "1" and a low level when each of the comparison outputs CQ3 and CN3 has the level of "0". The output signal R2 of the OR gate 212 is applied through a gate 214 to each of gates 193 and 197 so that each of the gates 193 and 197 is put in the ON state when the output signal R2 derived from the gate 214 has the high level.

Accordingly, the output Vq3 of the adder 191 is composed of a reference voltage VQ3, which is obtained from a reference voltage source 192 to correspond to the intake air mass flow Q3, when the output signal R2 derived from the gate 214 has the low level and composed of the reference voltage VQ3 and a reference voltage VQ3', which is obtained from a reference voltage source 194 to correspond to a difference between the intake air mass flows Q3 and Q6, added to each other when the output signal R2 derived from the gate 214 has the high level. Similarly, the output Vn3 of the adder 195 is composed of a reference voltage VN3, which is obtained from a reference voltage source 196 to correspond to the engine speed N3, when the output signal R2 derived from the gate 214 has the low level and composed of the reference voltage VN3 and a reference voltage VN3', which is obtained from a reference voltage source 198 to correspond to a difference between the engine speeds N3 and N6, added to each other when the output signal R2 derived from the gate 214 has the high level.

With such an arrangement including the level comparators 175 and 179 and the OR gate 212, in the case where the operating condition of the engine 101 is changing in such a manner that each of the intake air mass flow represented by the detection output signal Sa and the engine speed represented by the detection output signal Sn increases, the level of the output signal R2 derived from the gate 214 is changed to be high from low when the operating condition of the engine 101 varies to cross the line L6 on the characteristic chart of FIG. 10, and in the case where the operating condition of the engine 101 is changing in such a manner that each of the intake air mass flow represented by the detection output signal Sa and the engine speed represented by the detection output signal Sn decreases, the output signal R2 derived from the gate 214 is changed to be low from high when the operating condition of the engine 101 varies to cross the line L3 on the characteristic chart of FIG. 10. The output signal R2 derived from the OR gate 212 is used as the control signal E1 for controlling the three-way solenoid valve 127.

The detection output signal Sa is further supplied to a level comparator 176 to be compared in level with an output Vq4 of an adder 201 thereat. The level comparator 176 produces a comparison output CQ4 which has a level of "1" when the detection output signal Sa is equal in level to or larger in level than the output Vq4 of the adder 201 and a level of "0" when the detection output signal Sa is lower in level than the output Vq4 of the adder 201.

On the other hand, the detection output signal Sn is further supplied to a level comparator 180 to be compared in level with an output Vn4 of an adder 205 thereat. The level comparator 180 produces a comparison output CN4 which has a level of "1" when the detection output signal Sn is equal in level to or larger in level than the output Vn4 of the adder 205 and a level of "0" when the detection output signal Sn is lower in level than the output Vn4 of the adder 205.

The comparison outputs CQ4 and CN4 are supplied to an OR gate 213 and the OR gate 213 produces an output signal R3 which has a high level when at least one of the comparison outputs CQ4 and CN4 has the level of "1" and a low level when each of the comparison outputs CQ4 and CN4 has the level of "0". The output signal R3 of the OR gate 213 is applied to each of gates 203 and 207 so that each of the gates 203 and 207 is put in the ON state when the output signal R3 of the OR gate 213 has the high level.

Accordingly, the output Vq4 of the adder 201 is composed of a reference voltage VQ4, which is obtained from a reference voltage source 202 to correspond to the intake air mass flow Q4, when the output signal R3 of the OR gate 213 has the low level and composed of the reference voltage VQ4 and a reference voltage VQ4', which is obtained from a reference voltage source 204 to correspond to a difference between the intake air mass flows Q4 and Q5, added to each other when the output signal R3 has the high level. Similarly, the output Vn4 of the adder 205 is composed of a reference voltage VN4, which is obtained from a reference voltage source 206 to correspond to the engine speed N4, when the output signal R3 of the OR gate 213 has the low level and composed of the reference voltage VN4 and a reference voltage VN4', which is obtained from a reference voltage source 208 to correspond to a difference between the engine speeds N4 and N5, added to each other when the output signal R3 has the high level.

With such an arrangement including the level comparators 176 and 180 and the OR gate 213, in the case where the operating condition of the engine 101 is changing in such a manner that each of the intake air mass flow represented by the detection output signal Sa and the engine speed represented by the detection output signal Sn increases, the level of the output signal R3 obtained from the OR gate 213 is changed to be high from low when the operating condition of the engine 101 varies to cross the line L5 on the characteristic chart of FIG. 10, and in the case where the operating condition of the engine 101 is changing in such a manner that each of the intake air mass flow represented by the detection output signal Sa and the engine speed represented by the detection output signal Sn decreases, the output signal R3 of the OR gate 213 is changed to be low from high when the operating condition of the engine 101 varies to cross the line L4 on the characteristic chart of FIG. 10. The output signal R3 of the OR gate 213 thus obtained is as the control signals E3 and E4 for controlling the three-way solenoid valves 129 and 133, respectively.

The output signal R3 of the OR gate 213 is further supplied to a timer 215 as a setting signal or starting signal and the output signal R2 derived from the gate 214 is supplied to the timer 215 as a resetting signal. The timer 215 is supplied further with a load signal from a timer load signal generator 216. The load signal is selected to correspond to, for example, two seconds and loaded on the timer 215 when the timer is set.

The timer 215 is set to start measuring time when the output signal R3 is changed in level to be low from high and then operative to cease its measuring operation automatically to produce a timer output signal Tt having a high level when a predetermined period of time set in accordance with the load signal loaded thereon, for example, the period of two seconds has been measured. Further, the timer 215 is reset to produce the timer output signal Tt having a low level when the output signal R2 derived from the gate 214 is changed in level to be low from high. The timer output signal Tt is supplied to the gate 214 connected to the OR gate 212 and the gate 214 is turned to be in the OFF state from the ON state when the timer output signal Tt is changed in level to be high from low.

The output signal R2 is derived from the gate 214 without any change in its level when the gate 214 is in the ON state and modified to have the low level when the gate 214 is in the OFF state.

With such an arrangement containing the gate 214 and timer 215, when the operating condition of the engine 101 is changing in such a manner that each of the intake air mass flow represented by the detection output signal Sa and the engine speed represented by the detection output signal Sn decreases, the control signal E1 having the level for causing the three-way solenoid valve 127 to be in the OFF state is surely produced within a period of time equal to or shorter than the predetermined period of time set in accordance with the load signal, for example, the period of two second, since the control signal E3 having the level for causing the three-way solenoid valve 129 to be in the OFF state. This results in an advantage that backward flow of compressed air toward the secondary turbosupercharger 110 is prevented from arising when the rotation speeds of the turbine Ts of the secondary turbosupercharger 110 reduces gradually.

The detection output signal Sa is supplied further to a level comparator 220 to be compared in level with an output Vq10 of an adder 226 thereat. The level comparator 220 produces a comparison output CQ10 which has a level of "1" when the detection output signal Sa is equal in level to or larger in level than the output Vq10 of the adder 226 and a level of "0" when the detection output signal Sa is lower in level than the output Vq10 of the adder 226.

The detection output signal Sn is supplied further to a level comparator 222 to be compared in level with an output Vn10 of an adder 230 thereat and to a level comparator 223 to be compared in level with an output Vm10 of an adder 234 thereat. The level comparator 222 produces a comparison output CN10 which has a level of "1" when the detection output signal Sn is equal in level to or larger in level than the output Vn10 of the adder 230 and a level of "0" when the detection output signal Sn is lower in level than the output Vn10 of the adder 230. The level comparator 223 produces a comparison output CM10 which has a level of "1" when the detection output signal Sn is equal in level to or larger in level than the output Vm10 of the adder 234 and level of "0" when the detection output signal Sn is lower in level than the output Vm10 of the adder 234.

The comparison outputs CQ10 and CN10 are supplied to an AND gate 251 and the AND gate 251 produces an output signal R10 which has a high level when each of the comparison outputs CQ10 and CN10 has the level of "1" and a low level when at least one of the comparison outputs CQ10 and CN10 has the level of "0". The output signal R10 of the AND gate 251 and the comparison output CM10 are supplied to an OR gate 253 and the OR gate 253 produces an output signal R11 which has a high level when at least one of the output signal R10 and the comparison output CM10 has the level of "1" and a low level when each of the output signal R10 and the comparison output CM10 has the level of "0". The output signal R11 is supplied to each of gates 228, 232 and 236 so that each of the gates 228, 232 and 236 is put in the ON state when the output signal R11 of the OR gate 253 has the high level.

Accordingly, the output Vq10 of the adder 226 is composed of a reference voltage VQ10, which is obtained from a reference voltage source 227 to correspond to the intake air mass flow Q10, when the output signal R11 of the OR gate 253 has the low level and composed of the reference voltage VQ10 and a reference voltage VQ10', which is obtained from a reference voltage source 229 to correspond to a difference between the intake air mass flows Q10 and Q11, added to each other when the output signal R11 has the high level. Similarly, the output Vn10 of the adder 230 is composed of a reference voltage VN10, which is obtained from a reference voltage source 231 to correspond to the engine speed N10, when the output signal R11 of the OR gate 253 has the low level and composed of the reference voltage VN10 and a reference voltage VN10', which is obtained from a reference voltage source 233 to correspond to a difference between the engine speeds N10 and N11, added to each other when the output signal R11 has the high level. Further, the output Vm10 of the adder 234 is composed of a reference voltage VM10, which is obtained from a reference voltage source 235 to correspond to the engine speed n10, when the output signal R11 of the OR gate 253 has the low level and composed of the reference voltage VM10 and a reference voltage VM10', which is obtained from a reference voltage source 237 to correspond to a difference between the engine speeds n10 and n11, added to each other when the output signal R11 has the high level.

With such an arrangement including the level comparators 220, 222 and 223, the AND gate 251 and the OR gate 253, in the case where the operating condition of the engine 101 is changing in such a manner that each of the intake air mass flow represented by the detection output signal Sa and the engine speed represented by the detection output signal Sn increases, the level of the output signal R11 from the OR gate 253 is changed to be high from low when the operating condition of the engine 101 varies to cross the line L11 on the characteristic chart of FIG. 10, and in the case where the operating condition of the engine 101 is changing in such a manner that each of the intake air mass flow represented by the detection output signal Sa and the engine speed represented by the detection output signal Sn decreases, the output signal R11 of the OR gate 253 is changed to be low from high when the operating condition of the engine 101 varies to cross the line L10 on the characteristic chart of FIG. 10. The output signal R11 of the OR gate 253 thus obtained is used as the control signal E5 for controlling the three-way solenoid valve 168a.

The detection output signal Sa is supplied further to a level comparator 221 to be compared in level with an output Vq12 of an adder 238 thereat. The level comparator 221 produces a comparison output CQ12 which has a level of "1" when the detection output signal Sa is equal in level to or larger in level than the output Vq12 of the adder 238 and a level of "0" when the detection output signal Sa is lower in level than the output Vq12 of the adder 238.

The detection output signal Sn is supplied further to a level comparator 224 to be compared in level with an output Vn12 of an adder 242 thereat and to a level comparator 225 to be compared in level with an output Vm12 of an adder 246 thereat. The level comparator 224 produces a comparison output CN12 which has a level of "1" when the detection output signal Sn is equal in level to or larger in level than the output Vn12 of the adder 242 and a level of "0" when the detection output signal Sn is lower in level than the output Vn12 of the adder 242. The level comparator 225 produces a comparison output CM12 which has a level of "1" when the detection output signal Sn is equal in level to or larger in level than the output Vm12 of the adder 246 and a level of "0" when the detection output signal Sn is lower in level than the output Vm12 of the adder 246.

The comparison outputs CQ12 and CN12 are supplied to an AND gate 252 and the AND gate 252 produces an output signal R12 which has a high level when each of the comparison outputs CQ12 and CN12 has the level of "1" and a low level when at least one of the comparison outputs CQ12 10 and CN12 has the level of "0". The output signal R12 of the AND gate 252 and the comparison output CM12 are supplied to an OR gate 254 and the OR gate 254 produces an output signal R13 which has a high level when at least one of the output signal R12 and the comparison output CM12 has the level of "1" and a low level when each of the output signal R12 and the comparison output CM12 has the level of "0". The output signal R13 is supplied to each of gates 240, 244 and 248 so that each of the gates 240, 244 and 248 is put in the ON state when the output signal R13 of the OR gate 254 has the high level.

Accordingly, the output Vq12 of the adder 238 is composed of a reference voltage VQ12, which is obtained from a reference voltage source 239 to correspond to the intake air mass flow Q12, when the output signal R13 of the OR gate 254 has the low level and composed of the reference voltage VQ12 and a reference voltage VQ12', which is obtained from a reference voltage source 241 to correspond to a difference between the intake air mass flows Q12 and Q13, added to each other when the output signal R13 has the high level. Similarly, the output Vn12 of the adder 242 is composed of a reference voltage VN12, which is obtained from a reference voltage source 243 to correspond to the engine speed N12, when the output signal R13 of the OR gate 254 has the low level, and composed of the reference voltage VN12 and a reference voltage VN12', which is obtained from a reference voltage source 245 to correspond to a difference between the engine speeds N12 and N13, added to each other when the output signal R13 has the high level. Further, the output Vm12 of the adder 246 is composed of a reference voltage VM12, which is obtained from a reference voltage source 247 to correspond to the engine speed n12, when the output signal R13 of the OR gate 254 has the low level, and composed of the reference voltage VM12 and a reference voltage VM12', which is obtained from a reference voltage source 249 to correspond to a difference between the engine speeds n12 and n13, added to each other when the output signal R13 has the high level.

With such an arrangement including the level comparators 221, 224 and 225, the AND gate 252 and the OR gate 254, in the case where the operating condition of the engine 101 is changing in such a manner that each of the intake air mass flow represented by the detection output signal Sa and the engine speed represented by the detection output signal Sn increases, the level of the output signal R13 from the OR gate 254 is changed to be high from low when the operating condition of the engine 101 varies to cross the line L13 on the characteristic chart of FIG. 10, and in the case where the operating condition of the engine 101 is changing in such a manner that each of the intake air mass flow represented by the detection output signal Sa and the engine speed represented by the detection output signal Sn decreases, the output signal R12 of the OR gate 254 is changed to be low from high when the operating condition of the engine 101 varies to cross the line L12 on the characteristic chart of FIG. 10. The output signal R13 of the OR gate 254 thus obtained is used as the control signal E6 for controlling the three-way solenoid valve 168b.

What is claimed is:

1. An air supply and exhaust control system for an internal combustion engine comprising:
   a plurality of superchargers including at least first and second turbosuperchargers having respective turbines disposed in portions of an exhaust passage connected with the engine in parallel with each other and respective blowers disposed in an intake passage connected with the engine,
   operation prohibiting means including an exhaust cutoff valve provided in the portion of the exhaust passage wherein the turbine of said second turbosupercharger is disposed for closing the portion of the exhaust passage so as to prohibit the second turbosupercharger from working as occasion demands, exhaust gas flow determining means for generating an output signal corresponding to an exhaust gas flow amount in the exhaust passage, air supply control means for controlling said operation prohibiting means to prohibit said second turbosupercharger from working when the detection output obtained from said exhaust gas flow detecting means indicates that the exhaust gas flow is less than a first predetermined value, exhaust gas discharging means connected to a portion of the exhaust passage downstream of the turbine of said first turbosupercharger having a variable exhaust resistance for discharging the exhaust gas from the exhaust passage, exhaust resistance changing means for changing the variable exhaust resistance of said exhaust gas discharging means, and exhaust control means for controlling said exhaust resistance changing means to set the variable exhaust resistance of said exhaust gas discharging means to be relatively large when the detection output obtained from said exhaust gas flow detecting means indicates that the exhaust gas flow is less than a second predetermined value which is smaller than said first predetermined value and to be relatively small when the detection output obtained from said exhaust gas flow detecting means indicates that the exhaust gas flow is equal to or more than the second predetermined value.

2. An intake air and exhaust control system according to claim 1, said exhaust gas discharging means is disposed to be downstream of a position where said portions of the exhaust passage in which the turbines of said first and second turbosuperchargers are disposed, respectively, are incorporated.

3. An intake air and exhaust control system according to claim 1, wherein said exhaust gas discharging means comprises a variable silencer coupled with the exhaust passage for reducing exhaust sound with variable resistance to the exhaust gas which is discharged through a discharging passage provided in the variable silencer.

4. An intake air and exhaust control system according to claim 3, wherein said exhaust resistance changing means is operative selectively to partially close the discharging passage provided in said variable silencer.

5. An intake air and exhaust control system according to claim 1, wherein the blowers of said first and second turbosuperchargers are disposed respectively in branch portions of the intake passage provided in parallel with each other.

6. An intake air and exhaust control system according to claim 5, wherein an intake air cutoff valve is provided in the branch portion of the intake passage in which the blower of said first turbosupercharger is disposed.

7. An intake air and exhaust control system according to claim 1, wherein said exhaust gas flow detecting means is operative to obtain the detection output corresponding to the exhaust gas flow in the exhaust passage based on at least one of engine load and engine speed detected on said engine.

8. An intake air and exhaust control system according to claim 7, wherein said engine load is embodied by intake air mass flow fed to the engine.

9. An intake air and exhaust control system according to claim 1, wherein said exhaust gas flow detecting means is operative to obtain the detection output corresponding to the exhaust gas flow in the exhaust passage based on both of engine load and engine speed detected on said engine.

10. An intake air and exhaust control system according to claim 9, wherein said engine load is embodied by intake air mass flow fed to the engine.

11. An intake air and exhaust control system according to claim 1, said exhaust control means is operative to detect one of predetermined operating areas provided on an operating characteristic chart of the engine in which an actual operating condition of the engine resides and to control said exhaust resistance changing means in accordance with the detected operation area.

12. An intake air and exhaust control system according to claim 11, an exhaust bypass valve is provided in the exhaust passage, and said operating characteristic chart contains a first predetermined operating area used for controlling said exhaust cutoff valve to be open from closed, a second predetermined operating area used for controlling said exhaust bypass valve to be open from closed, and a third predetermined operating area used for controlling said exhaust resistance changing means to set the variable exhaust resistance of said exhaust gas discharging means to be relatively small, said second predetermined operating area being provided on the side of smaller exhaust gas flow compared with said first predetermined operating area, said third predetermined operating area being provided on the side of smaller exhaust gas flow compared with said second predetermined operating area.

13. An intake air and exhaust control system according to claim 11, said exhaust resistance changing means is operative to set the variable exhaust resistance of said exhaust gas discharging means to be large, medium and small selectively, and said operating characteristic chart contains a first predetermined operating area used for controlling said exhaust cutoff valve to change in its opening and closing condition, and a second predetermined operating area used for controlling the variable exhaust resistance of said exhaust gas discharging means to change between large and medium, said second predetermined operating area being provided on the side of smaller exhaust gas flow compared with said first predetermined operating area.

14. An intake air and exhaust control system according to claim 13, wherein an exhaust bypass valve is provided in the exhaust passage, and said operating characteristic chart further contains a third predetermined operating area used for controlling said exhaust bypass valve to be open from closed, said second predetermined operating area being provided on the side of larger exhaust gas flow compared with said third predetermined operating area.

15. An intake air and exhaust control system according to claim 1, wherein an exhaust bypass valve is provided in the exhaust passage to be operative to open in response to a first operating condition of the engine in which a first exhaust gas flow is obtained, said exhaust cutoff valve is operative to open in response to a second operating condition of the engine in which a second exhaust gas flow is obtained, and said exhaust resistance changing means is operative to set the variable exhaust resistance of said exhaust gas discharging means to be relatively small in response to a third operating condition of the engine in which a third exhaust gas flow is obtained, said first exhaust gas flow being smaller than said second exhaust gas flow, and said third exhaust gas flow being smaller than said first exhaust gas flow.

16. An intake air and exhaust control system according to claim 1, wherein said exhaust resistance changing means is operative to set the variable exhaust resistance of said exhaust gas discharging means to be large, medium and small selectively so that a change between large and medium of said variable exhaust resistance is caused in response to a first operating condition of the engine in which a first exhaust gas flow is obtained, and said exhaust cutoff valve is operative to open in response to a second operating condition of the engine in which a second exhaust gas flow is obtained, said first exhaust gas flow being smaller than said second exhaust gas flow.

17. An intake air and exhaust control system according to claim 15, wherein an exhaust bypass valve is provided in the exhaust passage to be operative to open in response to a third operating condition of the engine in which a third exhaust gas flow is obtained, said first exhaust gas flow being larger than said third exhaust gas flow.

* * * * *